(12) United States Patent
Tourapis et al.

(10) Patent No.: US 8,374,245 B2
(45) Date of Patent: Feb. 12, 2013

(54) SPATIOTEMPORAL PREDICTION FOR BIDIRECTIONALLY PREDICTIVE(B) PICTURES AND MOTION VECTOR PREDICTION FOR MULTI-PICTURE REFERENCE MOTION COMPENSATION

(75) Inventors: Alexandros Tourapis, Nicosia (CY); Shipeng Li, Redmond, WA (US); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1501 days.

(21) Appl. No.: 11/525,059

(22) Filed: Sep. 20, 2006

(65) Prior Publication Data

US 2007/0014358 A1 Jan. 18, 2007

Related U.S. Application Data

(63) Continuation of application No. 10/444,511, filed on May 23, 2003, now abandoned.

(60) Provisional application No. 60/385,965, filed on Jun. 3, 2002.

(51) Int. Cl.
*H04N 7/12* (2006.01)
*H04N 11/02* (2006.01)
*H04N 11/04* (2006.01)

(52) U.S. Cl. .......... 375/240.15; 375/240.16; 375/240.24

(58) Field of Classification Search .............. 375/240.15
See application file for complete search history.

(56) References Cited

U.S. PATENT DOCUMENTS

| | | |
|---|---|---|
| 4,454,546 A | 6/1984 | Mori |
| 4,661,849 A | 4/1987 | Hinman |
| 4,661,853 A | 4/1987 | Roeder et al. |
| 4,695,882 A | 9/1987 | Wada et al. |
| 4,796,087 A | 1/1989 | Guichard et al. |
| 4,849,812 A | 7/1989 | Borgers et al. |
| 4,862,267 A | 8/1989 | Gillard et al. |
| 4,864,393 A | 9/1989 | Harradine et al. |
| 5,021,879 A | 6/1991 | Vogel |
| 5,068,724 A | 11/1991 | Krause et al. |
| 5,089,887 A | 2/1992 | Robert et al. |
| 5,089,889 A | 2/1992 | Sugiyama |
| 5,091,782 A | 2/1992 | Krause et al. |
| 5,103,306 A | 4/1992 | Weiman et al. |
| 5,111,292 A | 5/1992 | Kuriacose et al. |
| 5,117,287 A | 5/1992 | Koike et al. |
| 5,132,792 A | 7/1992 | Yonemitsu et al. |
| 5,157,490 A | 10/1992 | Kawai et al. |
| 5,175,618 A | 12/1992 | Ueda |
| 5,185,819 A | 2/1993 | Ng et al. |

(Continued)

FOREIGN PATENT DOCUMENTS

| | | |
|---|---|---|
| EP | 0 279 053 | 8/1988 |
| EP | 0 397 402 | 11/1990 |

(Continued)

OTHER PUBLICATIONS

U.S. Appl. No. 60/341,674, filed Dec. 17, 2001, Lee et al.

(Continued)

*Primary Examiner* — Mehrdad Dastouri
*Assistant Examiner* — Jeremaiah Hallenbeck-Huber
(74) *Attorney, Agent, or Firm* — Klarquist Sparkman, LLP

(57) ABSTRACT

Several improvements for use with Bidirectionally Predictive (B) pictures within a video sequence are provided. In certain improvements Direct Mode encoding and/or Motion Vector Prediction are enhanced using spatial prediction techniques. In other improvements Motion Vector prediction includes temporal distance and subblock information, for example, for more accurate prediction. Such improvements and other presented herein significantly improve the performance of any applicable video coding system/logic.

39 Claims, 11 Drawing Sheets

U.S. PATENT DOCUMENTS

| | | |
|---|---|---|
| 5,193,004 A | 3/1993 | Wang et al. |
| 5,223,949 A | 6/1993 | Honjo |
| 5,227,878 A | 7/1993 | Puri et al. |
| 5,235,618 A | 8/1993 | Sakai et al. |
| 5,260,782 A | 11/1993 | Hui |
| 5,287,420 A | 2/1994 | Barrett |
| 5,298,991 A | 3/1994 | Yagasaki et al. |
| 5,317,397 A | 5/1994 | Odaka et al. |
| 5,343,248 A | 8/1994 | Fujinami |
| 5,347,308 A | 9/1994 | Wai |
| 5,400,075 A | 3/1995 | Savatier |
| 5,412,430 A | 5/1995 | Nagata |
| 5,412,435 A | 5/1995 | Nakajima |
| RE34,965 E | 6/1995 | Sugiyama |
| 5,424,779 A | 6/1995 | Odaka |
| 5,428,396 A | 6/1995 | Yagasaki |
| 5,442,400 A | 8/1995 | Sun |
| 5,448,297 A | 9/1995 | Alattar et al. |
| 5,453,799 A | 9/1995 | Yang et al. |
| 5,461,421 A | 10/1995 | Moon |
| RE35,093 E | 11/1995 | Wang et al. |
| 5,467,086 A | 11/1995 | Jeong |
| 5,467,134 A | 11/1995 | Laney et al. |
| 5,467,136 A | 11/1995 | Odaka |
| 5,477,272 A | 12/1995 | Zhang et al. |
| RE35,158 E | 2/1996 | Sugiyama |
| 5,510,840 A | 4/1996 | Yonemitsu et al. |
| 5,539,466 A | 7/1996 | Igarashi et al. |
| 5,565,922 A | 10/1996 | Krause |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,648,819 A | 7/1997 | Tranchard |
| 5,666,461 A | 9/1997 | Igarashi et al. |
| 5,677,735 A | 10/1997 | Ueno et al. |
| 5,687,097 A | 11/1997 | Mizusawa et al. |
| 5,691,771 A | 11/1997 | Oishi et al. |
| 5,699,476 A | 12/1997 | Van Der Meer |
| 5,701,164 A | 12/1997 | Kato |
| 5,717,441 A | 2/1998 | Serizawa et al. |
| 5,731,850 A | 3/1998 | Maturi et al. |
| 5,734,755 A | 3/1998 | Ramchandran et al. |
| 5,748,784 A | 5/1998 | Sugiyama |
| 5,767,898 A | 6/1998 | Urano et al. |
| 5,786,860 A | 7/1998 | Kim et al. |
| 5,787,203 A | 7/1998 | Lee et al. |
| 5,796,438 A | 8/1998 | Hosono |
| 5,798,788 A | 8/1998 | Meehan et al. |
| RE35,910 E | 9/1998 | Nagata et al. |
| 5,822,541 A | 10/1998 | Nonomura et al. |
| 5,835,144 A | 11/1998 | Matsumura et al. |
| 5,844,613 A | 12/1998 | Chaddha |
| 5,847,776 A | 12/1998 | Khmelnitsky |
| 5,874,995 A | 2/1999 | Naimpally et al. |
| 5,901,248 A | 5/1999 | Fandrianto et al. |
| 5,923,375 A | 7/1999 | Pau |
| 5,926,573 A | 7/1999 | Kim et al. |
| 5,929,940 A | 7/1999 | Jeannin |
| 5,946,042 A | 8/1999 | Kato |
| 5,949,489 A | 9/1999 | Nishikawa et al. |
| 5,959,673 A | 9/1999 | Lee et al. |
| 5,963,258 A | 10/1999 | Nishikawa et al. |
| 5,963,673 A | 10/1999 | Kodama et al. |
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,982,438 A | 11/1999 | Lin et al. |
| 5,990,960 A | 11/1999 | Murakami et al. |
| 5,991,447 A | 11/1999 | Eifrig et al. |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl |
| 6,026,195 A | 2/2000 | Eifrig et al. |
| 6,040,863 A | 3/2000 | Kato |
| 6,055,012 A | 4/2000 | Haskell et al. |
| 6,067,322 A | 5/2000 | Wang |
| 6,081,209 A | 6/2000 | Schuyler et al. |
| 6,094,225 A | 7/2000 | Han |
| RE36,822 E | 8/2000 | Sugiyama |
| 6,097,759 A | 8/2000 | Murakami et al. |
| 6,130,963 A | 10/2000 | Uz et al. |
| 6,154,495 A | 11/2000 | Yamaguchi et al. |
| 6,167,090 A | 12/2000 | Iizuka |
| 6,175,592 B1 | 1/2001 | Kim et al. |
| 6,188,725 B1 | 2/2001 | Sugiyama |
| 6,188,794 B1 | 2/2001 | Nishikawa et al. |
| 6,192,081 B1 | 2/2001 | Chiang et al. |
| 6,201,927 B1 | 3/2001 | Comer |
| 6,205,176 B1 | 3/2001 | Sugiyama |
| 6,205,177 B1 | 3/2001 | Girod et al. |
| RE37,222 E | 6/2001 | Yonemitsu et al. |
| 6,243,418 B1 | 6/2001 | Kim |
| 6,263,024 B1 | 7/2001 | Matsumoto |
| 6,263,065 B1 | 7/2001 | Durinovic-Johri et al. |
| 6,269,121 B1 | 7/2001 | Kwak |
| 6,271,885 B2 | 8/2001 | Sugiyama |
| 6,282,243 B1 | 8/2001 | Kazui et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,320,593 B1 | 11/2001 | Sobel et al. |
| 6,324,216 B1 | 11/2001 | Igarashi et al. |
| 6,377,628 B1 | 4/2002 | Schultz et al. |
| 6,381,279 B1 | 4/2002 | Taubman |
| 6,404,813 B1 | 6/2002 | Haskell et al. |
| 6,427,027 B1 | 7/2002 | Suzuki et al. |
| 6,459,812 B2 | 10/2002 | Suzuki et al. |
| 6,483,874 B1 | 11/2002 | Panusopone et al. |
| 6,496,601 B1 | 12/2002 | Migdal et al. |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,614,442 B1 | 9/2003 | Ouyang et al. |
| 6,636,565 B1 | 10/2003 | Kim |
| 6,647,061 B1 | 11/2003 | Panusopone et al. |
| 6,650,781 B2 | 11/2003 | Nakaya |
| 6,654,419 B1 | 11/2003 | Sriram et al. |
| 6,654,420 B1 | 11/2003 | Snook |
| 6,683,987 B1 | 1/2004 | Sugahara |
| 6,704,360 B2 | 3/2004 | Haskell et al. |
| 6,728,317 B1 | 4/2004 | Demos |
| 6,735,345 B2 | 5/2004 | Lin et al. |
| RE38,563 E | 8/2004 | Eifrig et al. |
| 6,785,331 B1 | 8/2004 | Jozawa et al. |
| 6,798,364 B2 | 9/2004 | Chen et al. |
| 6,798,837 B1 | 9/2004 | Uenoyama et al. |
| 6,807,231 B1 | 10/2004 | Wiegand et al. |
| 6,816,552 B2 | 11/2004 | Demos |
| 6,873,657 B2 | 3/2005 | Yang et al. |
| 6,876,703 B2 | 4/2005 | Ismaeil et al. |
| 6,900,846 B2 | 5/2005 | Lee et al. |
| 6,920,175 B2 | 7/2005 | Karczewicz et al. |
| 6,975,680 B2 | 12/2005 | Demos |
| 6,980,596 B2 | 12/2005 | Wang et al. |
| 6,999,513 B2 | 2/2006 | Sohn et al. |
| 7,003,035 B2 | 2/2006 | Tourapis et al. |
| 7,054,494 B2 | 5/2006 | Lin et al. |
| 7,092,576 B2 | 8/2006 | Srinivasan et al. |
| 7,154,952 B2 | 12/2006 | Tourapis et al. |
| 7,233,621 B2 | 6/2007 | Jeon |
| 7,280,700 B2 | 10/2007 | Tourapis et al. |
| 7,317,839 B2 | 1/2008 | Holcomb |
| 7,346,111 B2 | 3/2008 | Winger et al. |
| 7,362,807 B2 | 4/2008 | Kondo et al. |
| 7,388,916 B2 | 6/2008 | Park et al. |
| 7,567,617 B2 | 7/2009 | Holcomb |
| 7,646,810 B2 | 1/2010 | Tourapis et al. |
| 7,733,960 B2 * | 6/2010 | Kondo et al. ............ 375/240.16 |
| 2001/0019586 A1 | 9/2001 | Kang et al. |
| 2001/0040926 A1 | 11/2001 | Hannuksela et al. |

| | | | |
|---|---|---|---|
| 2002/0105596 A1 | 8/2002 | Selby | |
| 2002/0114388 A1 | 8/2002 | Ueda | |
| 2002/0122488 A1 | 9/2002 | Takahashi et al. | |
| 2002/0154693 A1 | 10/2002 | Demos | |
| 2002/0186890 A1 | 12/2002 | Lee et al. | |
| 2003/0053537 A1 | 3/2003 | Kim et al. | |
| 2003/0099292 A1 | 5/2003 | Wang et al. | |
| 2003/0099294 A1 | 5/2003 | Wang et al. | |
| 2003/0112864 A1 | 6/2003 | Karczewicz et al. | |
| 2003/0113026 A1 | 6/2003 | Srinivasan et al. | |
| 2003/0142748 A1 | 7/2003 | Tourapis | |
| 2003/0142751 A1 | 7/2003 | Hannuksela | |
| 2003/0156646 A1 | 8/2003 | Hsu et al. | |
| 2003/0202590 A1 | 10/2003 | Gu et al. | |
| 2003/0206589 A1 | 11/2003 | Jeon | |
| 2004/0001546 A1 | 1/2004 | Tourapis et al. | |
| 2004/0008899 A1 | 1/2004 | Tourapis et al. | |
| 2004/0047418 A1 | 3/2004 | Tourapis et al. | |
| 2004/0136457 A1 | 7/2004 | Funnell et al. | |
| 2004/0139462 A1 | 7/2004 | Hannuksela et al. | |
| 2004/0141651 A1 | 7/2004 | Hara et al. | |
| 2004/0146109 A1 | 7/2004 | Kondo et al. | |
| 2004/0228413 A1 | 11/2004 | Hannuksela | |
| 2004/0234143 A1 | 11/2004 | Hagai et al. | |
| 2005/0013497 A1 | 1/2005 | Hsu et al. | |
| 2005/0013498 A1 | 1/2005 | Srinivasan | |
| 2005/0036759 A1 | 2/2005 | Lin et al. | |
| 2005/0053137 A1 | 3/2005 | Holcomb | |
| 2005/0053147 A1 | 3/2005 | Mukerjee et al. | |
| 2005/0053149 A1 | 3/2005 | Mukerjee et al. | |
| 2005/0100093 A1 | 5/2005 | Holcomb | |
| 2005/0129120 A1 | 6/2005 | Jeon | |
| 2005/0135484 A1 | 6/2005 | Lee | |
| 2005/0147167 A1 | 7/2005 | Dumitras et al. | |
| 2005/0185713 A1 | 8/2005 | Winger et al. | |
| 2005/0207490 A1 | 9/2005 | Wang | |
| 2005/0249291 A1 | 11/2005 | Gordon et al. | |
| 2005/0254584 A1 | 11/2005 | Kim et al. | |
| 2006/0013307 A1 | 1/2006 | Olivier et al. | |
| 2006/0072662 A1 | 4/2006 | Tourapis et al. | |
| 2006/0280253 A1 | 12/2006 | Tourapis et al. | |
| 2007/0064801 A1 | 3/2007 | Wang et al. | |
| 2007/0177674 A1 | 8/2007 | Yang | |
| 2008/0043845 A1 | 2/2008 | Nakaishi | |
| 2008/0069462 A1 | 3/2008 | Abe | |
| 2008/0075171 A1 | 3/2008 | Suzuki | |
| 2008/0117985 A1 | 5/2008 | Chen et al. | |
| 2009/0238269 A1 | 9/2009 | Pandit et al. | |

FOREIGN PATENT DOCUMENTS

| | | |
|---|---|---|
| EP | 0 526 163 | 2/1993 |
| EP | 0 535 746 | 4/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 771 114 | 5/1997 |
| EP | 0 782 343 | 7/1997 |
| EP | 0 786 907 | 7/1997 |
| EP | 0 830 029 | 3/1998 |
| EP | 0 863 673 A1 | 9/1998 |
| EP | 0 863 674 | 9/1998 |
| EP | 0 863 675 | 9/1998 |
| EP | 0 874 526 | 10/1998 |
| EP | 0 884 912 | 12/1998 |
| EP | 0 901 289 | 3/1999 |
| EP | 0 944 245 | 9/1999 |
| EP | 1 006 732 | 7/2000 |
| EP | 1 427 216 | 6/2006 |
| GB | 2328337 | 2/1999 |
| GB | 2332115 | 6/1999 |
| GB | 2343579 | 5/2000 |
| JP | 61205086 | 9/1986 |
| JP | 62 213 494 | 9/1987 |
| JP | 3-001688 | 1/1991 |
| JP | 3 129 986 | 3/1991 |
| JP | 05-137131 | 6/1993 |
| JP | 6 078 298 | 3/1994 |
| JP | 6-078295 | 3/1994 |
| JP | 06-276481 | 9/1994 |
| JP | 06-276511 | 9/1994 |
| JP | 6-292188 | 10/1994 |
| JP | 7-274171 | 10/1995 |
| JP | 07-274181 | 10/1995 |
| JP | 09-121355 | 5/1997 |
| JP | 09-322163 | 12/1997 |
| JP | 10056644 | 2/1998 |
| JP | 08-140099 | 5/1999 |
| JP | 11 136683 | 5/1999 |
| JP | 2000-307672 | 11/2000 |
| JP | 2000-308064 | 11/2000 |
| JP | 2001-025014 | 1/2001 |
| JP | 2002-118598 | 4/2002 |
| JP | 2002-121053 | 4/2002 |
| JP | 2002-156266 | 5/2002 |
| JP | 2002-177889 | 6/2002 |
| JP | 2002-193027 | 7/2002 |
| JP | 2002-204713 | 7/2002 |
| JP | 2004-208259 | 7/2004 |
| RU | 2182727 C2 | 5/2002 |
| WO | WO 00/33581 | 8/2000 |
| WO | 01/95633 | 12/2001 |
| WO | 02/37859 | 5/2002 |
| WO | 02/43399 | 5/2002 |
| WO | 02/062074 | 8/2002 |
| WO | WO 03/026296 | 3/2003 |
| WO | WO 03/047272 | 6/2003 |
| WO | 03/090473 | 10/2003 |
| WO | WO 03/090475 | 10/2003 |
| WO | WO 2005/004491 | 1/2005 |
| WO | WO 2008/023967 | 1/2008 |

OTHER PUBLICATIONS

U.S. Appl. No. 60/488,710, filed Jul. 18, 2003, Srinivasan et al.

Anonymous, "DivX Multi Standard Video Encoder," 2 pp.

Chalidabhongse et al., "Fast motion vector estimation using multiresolution spatio-temporal correlations," IEEE Transactions on Circuits and Systems for Video Technology, pp. 477-488 (Jun. 1997).

Ericsson, "Fixed and Adaptive Predictors for Hybrid Predictive/Transform Coding," *IEEE Transactions on Comm.*, vol. COM-33, No. 12, pp. 1291-1302 (1985).

Flierl et al., "Multihypothesis Motion Estimation for Video Coding," *Proc. DCC*, 10 pp. (Mar. 2001).

Fogg, "Survey of Software and Hardware VLC Architectures," *SPIE*, vol. 2186, pp. 29-37 (1994).

Girod, "Efficiency Analysis of Multihypothesis Motion-Compensated Prediction for Video Coding," *IEEE Transactions on Image Processing*, vol. 9, No. 2, pp. 173-183 (Feb. 2000).

Girod, "Motion-Compensation: Visual Aspects, Accuracy, and Fundamental Limits," *Motion Analysis and Image Sequence Processing*, Kluwer Academic Publishers, pp. 125-152 (1993).

Horn et al., "Estimation of Motion Vector Fields for Multiscale Motion Compensation," *Proc. Picture Coding Symp. (PCS 97)*, pp. 141-144 (Sep. 1997).

Hsu et al., "A Low Bit-Rate Video Codec Based on Two-Dimensional Mesh Motion Compensation with Adaptive Interpolation," *IEEE Transactions on Circuits and Systems for Video Technology*, vol. 11, No. 1, pp. 111-117 (Jan. 2001).

ISO/IEC, "MPEG-4 Video Verification Model Version 18.0," ISO/IEC JTC1/SC29/WG11 N3908, Pisa, pp. 1-10, 299-311 (Jan. 2001).

ISO/IEC, "ISO/IEC 11172-2: Information Technology—Coding of Moving Pictures and Associated Audio for Storage Mediaat up to About 1.5 Mbit/s," 122 pp. (1993).

ISO/IEC, "Information Technology—Coding of Audio-Visual Objects: Visual, ISO/IEC 14496-2, Committee Draft," 330 pp. (1998).

ISO/IEC, "MPEG-4 Video Verification Model Version 10.0," ISO/IEC JTC1/SC29/WG11, MPEG98/N1992, 305 pp. (1998).

ITU—Q15-F-24, "MVC Video Codec—Proposal for H.26L," Study Group 16, Video Coding Experts Group (Question 15), 28 pp. (document marked as generated in 1998).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

Joint Video Team of ISO/IEC MPEG and ITU-T VCEG, "Text of Committee Draft of Joint Video Specification (ITU-T Rec. H.264, ISO/IEC 14496-10 AVC)," Document JVT-C167, 143 pp. (May 2002).

Joint Video Team of ISO/IEC MPEG and ITU-T VCEG, "Joint Final Committee Draft (JFCD) of Joint Video Specification (ITU-T Recommendation H.264, ISO/IEC 14496-10 AVC," JVT-D157 (Aug. 2002).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).

Joint Video Team (JVT) of ISO/IEC MPEG and ITU-T VCEG, "Study of Final Committee Draft of Joint Video Specification," JVT-F100, Awaji Island, 242 pp. (Dec. 2002).

Konrad et al., "On Motion Modeling and Estimation for Very Low Bit Rate Video Coding," Visual Comm. & Image Processing (VCIP '95), 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Microsoft Corporation, "Microsoft Debuts New Windows Media Players 9 Series, Redefining Digital Media on the PC," 4 pp. (Sep. 4, 2002) [Downloaded from the World Wide Web on May 14, 2004].

Mook, "Next-Gen Windows Media Player Leaks to the Web," BetaNews, 17 pp. (Jul. 19, 2002) [Downloaded from the World Wide Web on Aug. 8, 2003].

Panusopone et al., "Direct Prediction for Predictive (P) Picture in Field Coding mode," Joint Video Team (JVT) of ISO/IEC MPEG & ITU-T VCEG, Document JVT-D046, 8 pp. (Jul. 2002).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Schwarz et al., "Tree-structured macroblock partition," ITU-T SG16/Q.6 VCEG-O17, 6 pp. (Dec. 2001).

Schwarz et al., "Core Experiment Results on Improved Macroblock Prediction Modes," Joint Video Team (JVT) of ISO/IEC MPEG & ITU-T VCEG (ISO/IEC JTC1/SC29/WG11 and ITU-T SG16 Q.6), Document JVT-B054, 10 pp. (Jan.-Feb. 2002).

Sullivan et al., "The H.264/AVC Advanced Video Coding Standard: Overview and Introduction to the Fidelity Range Extensions," 21 pp. (Aug. 2004).

"The TML Project Web-Page and Archive," (including pages of code marked "image.cpp for H.26L decoder, Copyright 1999" and "image. c"), 24 pp.

Tourapis et al., "Direct Prediction for Predictive (P) and Bidirectionally Predictive (B) frames in Video Coding," Joint Video Team (JVT) of ISO/IEC MPEG & ITU-T VCEG (ISO/IEC JTC1/SC29/WG11 and ITU-T SG16 Q.6), Document JVT-C128, 11 pp. (May 2002).

Tourapis et al., "Motion Vector Prediction in Bidirectionally Predictive (B) frames with regards to Direct Mode," Joint Video Team (JVT) of ISO/IEC MPEG & ITU-T VCEG (ISO/IEC JTC1/SC29/WG11 and ITU-T SG16 Q.6), Document JVT-C127, 7 pp. (May 2002).

Tourapis et al., "Timestamp Independent Motion Vector Prediction for P and B frames with Division Elimination," Joint Video Team (JVT) of ISO/IEC MPEG & ITU-T VCEG (ISO/IEC JTC1/SC29/WG11 and ITU-T SG16 Q.6), Document JVT-D040, 18 pp. (Jul. 2002).

Tourapis et al., "Performance Comparison of Temporal and Spatial Direct mode," Joint Video Team (JVT) of ISO/IEC MPEG & ITU-T VCEG (ISO/IEC JTC1/SC29/WG11 and ITU-T SG16 Q.6), Document JVT-E026, 7 pp. (Oct. 2002).

Wang et al., "Interlace Coding Tools for H.26L Video Coding," ITU-T SG16/Q.6 VCEG-O37, pp. 1-20 (Dec. 2001).

Wiegand et al., "Motion-compensating Long-term Memory Prediction," Proc. Int'l Conf. on Image Processing, 4 pp. (Oct. 1997).

Wiegand et al., "Long-term Memory Motion Compensated Prediction," IEEE Transactions on Circuits & Systems for Video Technology, vol. 9, No. 1, pp. 70-84 (Feb. 1999).

Wien, "Variable Block-Size Transforms for Hybrid Video Coding," Dissertation, 182 pp. (Feb. 2004).

Wu et al., "Joint estimation of forward and backward motion vectors for interpolative prediction of video," IEEE Transactions on Image Processing, vol. 3, No. 5, pp. 684-687 (Sep. 1994).

Yu et al., "Two-Dimensional Motion Vector Coding for Low Bitrate Videophone Applications," Proc. Int'l Conf on Image Processing, Los Alamitos, US, pp. 414-417, IEEE Comp. Soc. Press (1995).

U.S. Appl. No. 60/501,081, filed Sep. 7, 2003, Srinivasan et al.

Decision on Grant dated Apr. 2, 2007, from Russian Patent Application No. 2003116281, 5 pp.

European Official Communication dated Oct. 28, 2005, from European Patent Application No. 03 011 935.8, 3 pp.

European Search Report dated Dec. 4, 2003, from European Patent Application No. 03 011 935.8, 5 pp.

Examiner's First Report dated Nov. 29, 2007, from Australian Patent Application No. 2003204477, 2 pp.

Examiner's Report No. 2 dated Jun. 24, 2008, from Australian Patent Application No. 2003204477, 2 pp.

Grigoriu, "Spatio-temporal compression of the motion field in video coding," *2001 IEEE Fourth Workshop on Multimedia Signal Processing*, pp. 129-134 (Oct. 2001).

Huang et al., "Hardware architecture design for variable block size motion estimation in MPEG-4 AVC/JVT/ITU-T H.264," *Proc. of the 2003 Int'l Symposium on Circuits & Sys. (ISCAS '03)*, vol. 2, pp. 796-799 (May 2003).

Joint Video Team (JVT) of ISO/IEC MPEG and ITU-T VCEG, Working Draft No. 2, Revision 2 (WD-2), JVT-B118r2, 106 pp. (Jan. 2002).

Notice of Acceptance dated Feb. 26, 2009, from Australian Patent Application No. 2003204477, 3 pp.

Notice of Allowance dated Apr. 12, 2010, from Korean Patent Application No. 10-2003-0035240, 2 pp.

Notice of Preliminary Rejection dated Sep. 24, 2009, from Korean Patent Application No. 10-2003-0035240, 4 pp.

Notice of Rejection dated Dec. 8, 2009, from Japanese Patent Application No. 2003-157240, 5 pp.

Notice of Rejection dated Sep. 17, 2010, from Japanese Patent Application No. 2003-157240, 3 pp.

Notice on Grant of Patent Right for Invention dated Sep. 19, 2008, from Chinese Patent Application No. 03141275.0, 4 pp.

Notice on Office Action dated Sep. 1, 2006, from Chinese Patent Application No. 03141275.0, 9 pp.

Official Action dated Dec. 11, 2006, from Russian Patent Application No. 2003116281, 10 pp.

Official Notice of Final Rejection dated Apr. 9, 2010, from Japanese Patent Application No. 2003-157240, 4 pp.

The Second Office Action dated Nov. 16, 2007, from Chinese Patent Application No. 03141275.0, 8 pp.

Wang et al., "Adaptive frame/field coding for JVT Video Coding," ITU-T SG16 Q.6 JVT-B071, 24 pp. (Jan. 2002).

Abe et al., "Clarification and Improvement of Direct Mode," JVT-D033, 9 pp. (document marked Jul. 16, 2002).

Gu et al., "Introducing Direct Mode P-picture (DP) to reduce coding complexity," Joint Video Team (JVT) of ISO/IEC MPEG & ITU-T VCEG, Document No. JVT-C044, 10 pp. (Mar. 2002).

Jeon et al., "B picture coding for sequence with repeating scene changes," JVT-C120, 9 pp. (document marked May 1, 2002).

Kondo et al., "New Prediction Method to Improve B-picture Coding Efficiency," VCEG-O26, 9 pp. (document marked Nov. 26, 2001).

Kondo et al., "Proposal of Minor Changes to Multi-frame Buffering Syntax for Improving Coding Efficiency of B-pictures," JVT-B057, 10 pp. (document marked Jan. 23, 2002).

Notice of Allowance dated Apr. 1, 2011, from Japanese Patent Application No. 2003-157240, 6 pp.

Tourapis et al., "Temporal Interpolation of Video Sequences Using Zonal Based Algorithms," *IEEE*, pp. 895-898 (Oct. 2001).

Wiegand, "H.26L Test Model Long-Term No. 9 (TML-9) draft 0," ITU-Telecommunications Standardization Sector, Study Group 16, VCEG-N83, 74 pp. (Dec. 2001).
U.S. Appl. No. 10/942,524.
U.S. Appl. No. 12/364,325.
U.S. Appl. No. 13/459,809.
U.S. Appl. No. 11/525,059.
U.S. Appl. No. 10/462,085.
U.S. Appl. No. 11/465,938.
U.S. Appl. No. 11/275,103.
U.S. Appl. No. 12/474,821.
U.S. Appl. No. 11/824,550.
U.S. Appl. No. 10/622,378.
Ji et al., "New Bi-Prediction Techniques for B Pictures Coding," *IEEE Int'l Conf. on Multimedia and Expo*, pp. 101-104 (Jun. 2004).
Joint Video Team (JVT) of ISO/IEC MPEG and ITU-T VCEG, Working Draft No. 2, Revision 0 (WD-2), JVT-B118r1, 105 pp. (Jan. 2002).
Ko et al., "Fast Intra-Mode Decision Using Inter-Frame Correlation for H.264/AVC," Proc. IEEE ISCE 2008, 4 pages (Apr. 2008).
Official Action dated Mar. 22, 2012, from Canadian Patent Application No. 2,430,460, 3 pp.
Official Action dated Sep. 21, 2011, from Canadian Patent Application No. 2,430,460, 3 pp.

Pourazad et al., "An H.264-based Video Encoding Scheme for 3D TV," EURASIP European Signal Processing Conference—EUSIPCO, Florence, Italy, 5 pages (Sep. 2006).
Tourapis et al., "Direct Mode Coding for Bipredictive Slices in the H.264 Standard," *IEEE Trans. on Circuits and Systems for Video Technology*, vol. 15, No. 1, pp. 119-126 (Jan. 2005).
Chujoh et al., "Verification result on the combination of spatial and temporal," JVT-E095, 5 pp. (Oct. 2002).
Jeon, "Clean up for temporal direct mode," JVT-E097, 13 pp. (Oct. 2002).
Jeon, "Direct mode in B pictures," JVT-D056, 10 pp. (Jul. 2002).
Jeon, "Motion vector prediction and prediction signal in B pictures," JVT-D057, 5 pp. (Jul. 2002).
Kadono et al., "Memory reduction for temporal technique of direct mode," JVT-E076, 12 pp. (Oct. 2002).
Suzuki, "Handling of reference pictures and MVs for direct mode," JVT-D050, 11 pp. (Jul. 2002).
Suzuki et al., "Study of direct mode," JVT-E071 r1, 7 pp. (Oct. 2002).
Tourapis et al., "B picture and ABP finalization," JVT-E018, 2 pp. (Oct. 2002).
Winger et al., "HD temporal direct-mode verification & text," JVT-E037, 8 pp. (Oct. 2002).

* cited by examiner

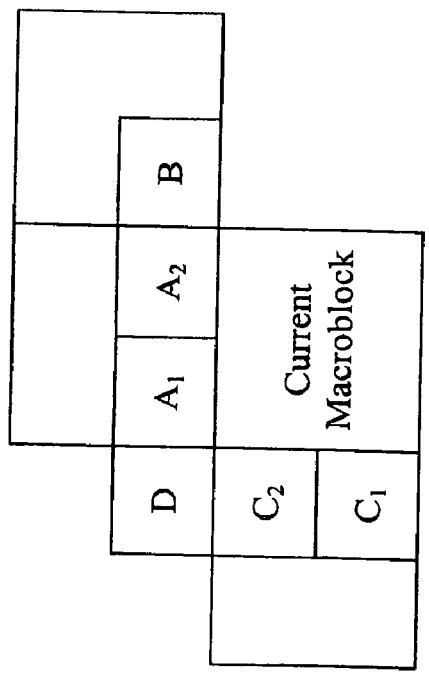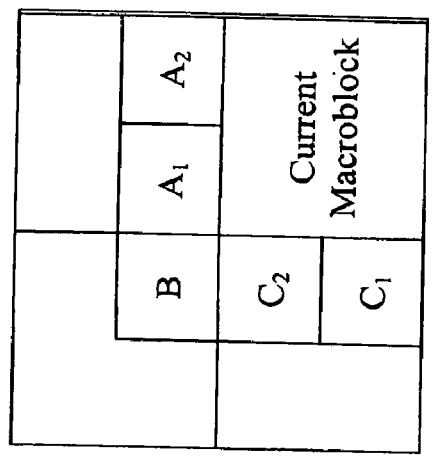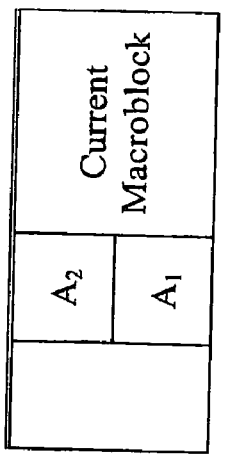
Fig. 17

SPATIOTEMPORAL PREDICTION FOR BIDIRECTIONALLY PREDICTIVE(B) PICTURES AND MOTION VECTOR PREDICTION FOR MULTI-PICTURE REFERENCE MOTION COMPENSATION

RELATED PATENT APPLICATIONS

This application is a continuation of U.S. patent application Ser. No. 10/444,511, filed May 23, 2003, the disclosure of which is hereby incorporated by reference, which claims the benefit of, and hereby incorporates by reference the entire disclosure of, U.S. Provisional Application No. 60/385,965, filed Jun. 3, 2002, and titled "Spatialtemporal Prediction for Bidirectionally Predictive (B) Frames and Motion Vector Prediction for Multi-Frame Reference Motion Compensation."

TECHNICAL FIELD

This invention relates to video coding, and more particularly to methods and apparatuses for providing improved coding and/or prediction techniques associated with different types of video data.

BACKGROUND

The motivation for increased coding efficiency in video coding has led to the adoption in the Joint Video Team (JVT) (a standards body) of more refined and complicated models and modes describing motion information for a given macroblock. These models and modes tend to make better advantage of the temporal redundancies that may exist within a video sequence. See, for example, IUU-T, Video Coding Expert Group (VCEG), "JVT Coding—(ITU-T H.26L & ISO/IEC JTC1 Standard)—Working Draft Number 2 (WD-2)", ITU-T JVT-B118, March 2002; and/or Heiko Schwarz and Thomas Wiegand, "Tree-structured macroblock partition", Doc. VCEG-N17, Dec. 2001.

There is continuing need for further improved methods and apparatuses that can support the latest models and modes and also possibly introduce new models and modes to take advantage of improved coding techniques.

SUMMARY

The above state needs and other are addressed, for example, by a method for use in encoding video data within a sequence of video frames. The method includes identifying at least a portion of at least one video frame to be a Bidirectionally Predictive (B) picture, and selectively encoding the B picture using at least spatial prediction to encode at least one motion parameter associated with the B picture. In certain exemplary implementations the B picture may include a block, a macroblock, a subblock, a slice, or other like portion of the video frame. For example, when a macroblock portion is used, the method produces a Direct Macroblock.

In certain further exemplary implementations, the method further includes employing linear or non-linear motion vector prediction for the B picture based on at least one reference picture that is at least another portion of the video frame. By way of example, in certain implementations, the method employs median motion vector prediction to produce at least one motion vector.

In still other exemplary implementations, in addition to spatial prediction, the method may also process at least one other portion of at least one other video frame to further selectively encode the B picture using temporal prediction to encode at least one temporal-based motion parameter associated with the B picture. In some instances the temporal prediction includes bidirectional temporal prediction, for example based on at least a portion of a Predictive (P) frame.

In certain other implementations, the method also selectively determines applicable scaling for a temporal-based motion parameter based at least in part on a temporal distance between the predictor video frame and the frame that includes the B picture. In certain implementations temporal distance information is encoded, for example, within a header or other like data arrangement associated with the encoded B picture.

BRIEF DESCRIPTION OF THE DRAWINGS

The present invention is illustrated by way of example and not limitation in the figures of the accompanying drawings. The same numbers are used throughout the figures to reference like components and/or features.

FIGS. 17a-c are illustrative diagrams depicting Motion Vector Predictors for one MV with additional predictors for 8×8 partitioning, in accordance with certain exemplary implementations of the present invention.

DETAILED DESCRIPTION

Figure 1:
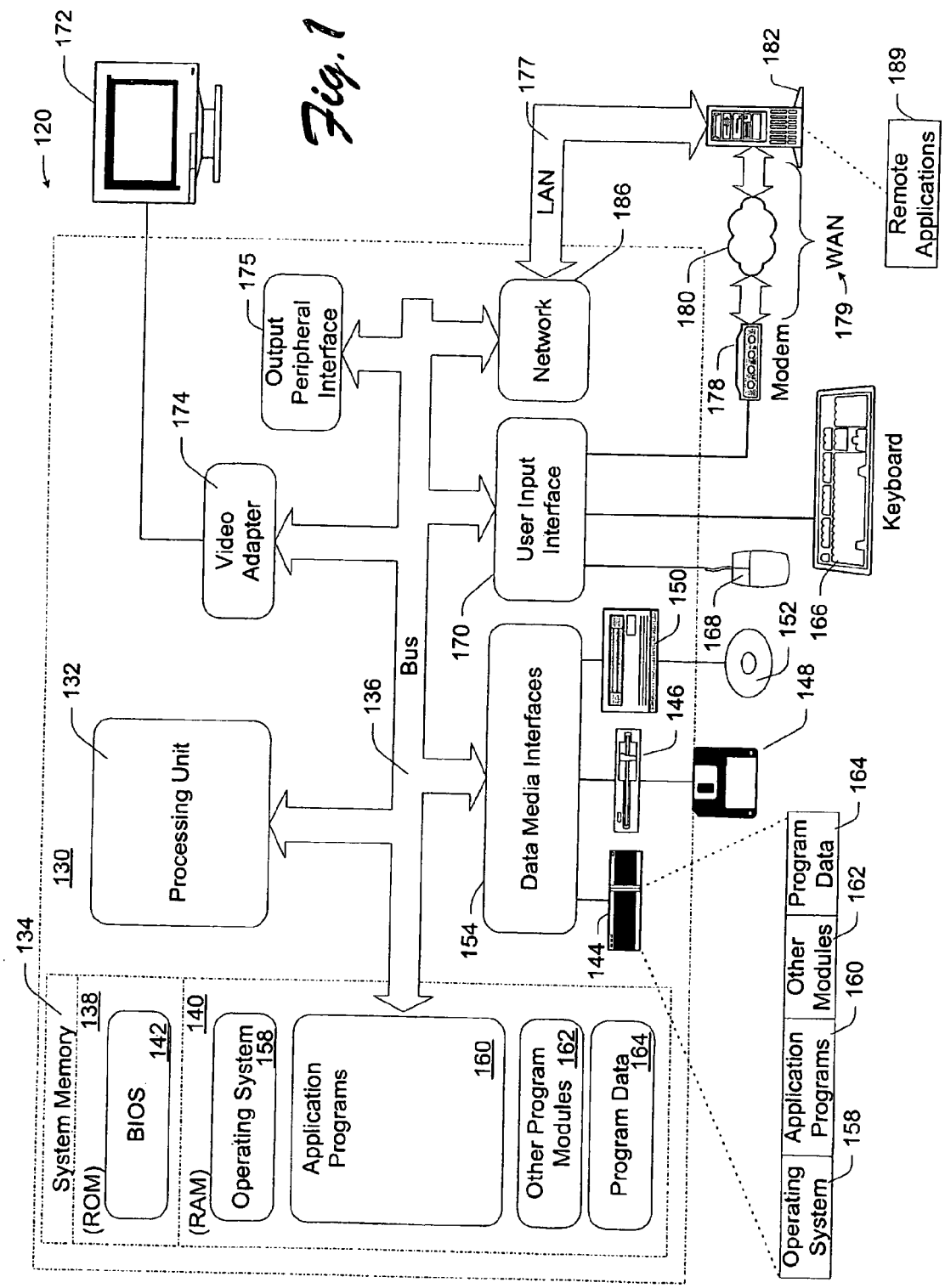
FIG. 1 is a block diagram depicting an exemplary computing environment that is suitable for use with certain implementations of the present invention.

Several improvements for use with Bidirectionally Predictive (B) pictures within a video sequence are described below and illustrated in the accompanying drawings. In certain improvements Direct Mode encoding and/or Motion Vector Prediction are enhanced using spatial prediction techniques. In other improvements Motion Vector prediction includes temporal distance and subblock information, for example, for more accurate prediction. Such improvements and other presented herein significantly improve the performance of any applicable video coding system/logic.

While these and other exemplary methods and apparatuses are described, it should be kept in mind that the techniques of the present invention are not limited to the examples described and shown in the accompanying drawings, but are also clearly adaptable to other similar existing and future video coding schemes, etc.

Before introducing such exemplary methods and apparatuses, an introduction is provided in the following section for suitable exemplary operating environments, for example, in the form of a computing device and other types of devices/appliances.

Exemplary Operational Environments:

Turning to the drawings, wherein like reference numerals refer to like elements, the invention is illustrated as being implemented in a suitable computing environment. Although not required, the invention will be described in the general context of computer-executable instructions, such as program modules, being executed by a personal computer.

Generally, program modules include routines, programs, objects, components, data structures, etc. that perform particular tasks or implement particular abstract data types. Those skilled in the art will appreciate that the invention may be practiced with other computer system configurations, including hand-held devices, multi-processor systems, microprocessor based or programmable consumer electronics, network PCs, minicomputers, mainframe computers, portable communication devices, and the like.

The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described systems, apparatuses and methods may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
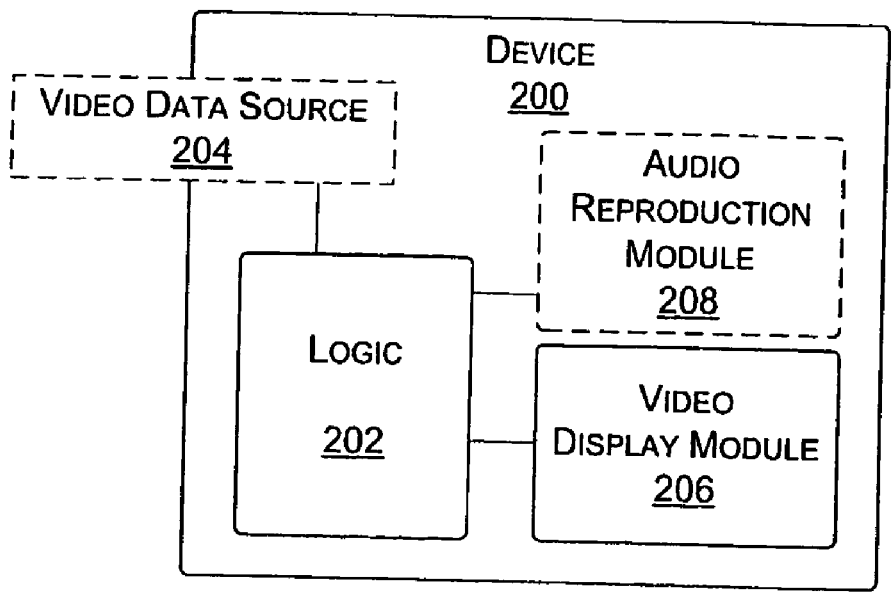
FIG. 2 is a block diagram depicting an exemplary representative device that is suitable for use with certain implementations of the present invention.

Attention is now drawn to FIG. 2, which is a block diagram depicting another exemplary device 200 that is also capable of benefiting from the methods and apparatuses disclosed herein. Device 200 is representative of any one or more devices or appliances that are operatively configured to process video and/or any related types of data in accordance with all or part of the methods and apparatuses described herein and their equivalents. Thus, device 200 may take the form of a computing device as in FIG. 1, or some other form, such as, for example, a wireless device, a portable communication device, a personal digital assistant, a video player, a television, a DVD player, a CD player, a karaoke machine, a kiosk, a digital video projector, a flat panel video display mechanism, a set-top box, a video game machine, etc. In this example, device 200 includes logic 202 configured to process video data, a video data source 204 configured to provide vide data to logic 202, and at least one display module 206 capable of displaying at least a portion of the video data for a user to view. Logic 202 is representative of hardware, firmware, software and/or any combination thereof. In certain implementations, for example, logic 202 includes a compressor/decompressor (codec), or the like. Video data source 204 is representative of any mechanism that can provide, communicate, output, and/or at least momentarily store video data suitable for processing by logic 202. Video reproduction source is illustratively shown as being within and/or without device 200. Display module 206 is representative of any mechanism that a user might view directly or indirectly and see the visual results of video data presented thereon. Additionally, in certain implementations, device 200 may also include some form or capability for reproducing or otherwise handling audio data associated with the video data. Thus, an audio reproduction module 208 is shown.

With the examples of FIGS. 1 and 2 in mind, and others like them, the next sections focus on certain exemplary methods and apparatuses that may be at least partially practiced using with such environments and with such devices.

Encoding Bidirectionally Predictive (B) Pictures And Motion Vector Prediction

This section describes several exemplary improvements that can be implemented to encode Bidirectionally Predictive (B) pictures and Motion Vector prediction within a video coding system or the like. The exemplary methods and apparatuses can be applied to predict motion vectors and enhancements in the design of a B picture Direct Mode. Such methods and apparatuses are particularly suitable for multiple picture reference codecs, such as, for example, JVT, and can achieve considerable coding gains especially for panning sequences or scene changes.

Bidirectionally Predictive (B) pictures are an important part of most video coding standards and systems since they tend to increase the coding efficiency of such systems, for example, when compared to only using Predictive (P) pictures. This improvement in coding efficiency is mainly achieved by the consideration of bidirectional motion compensation, which can effectively improve motion compensated prediction and thus allow the encoding of significantly reduced residue information. Furthermore, the introduction of the Direct Prediction mode for a Macroblock/block within such pictures can further increase efficiency considerably (e.g., more than 10-20%) since no motion information is encoded. Such may be accomplished, for example, by allowing the prediction of both forward and backward motion information to be derived directly from the motion vectors used in the corresponding macroblock of a subsequent reference picture.

Figure 4:
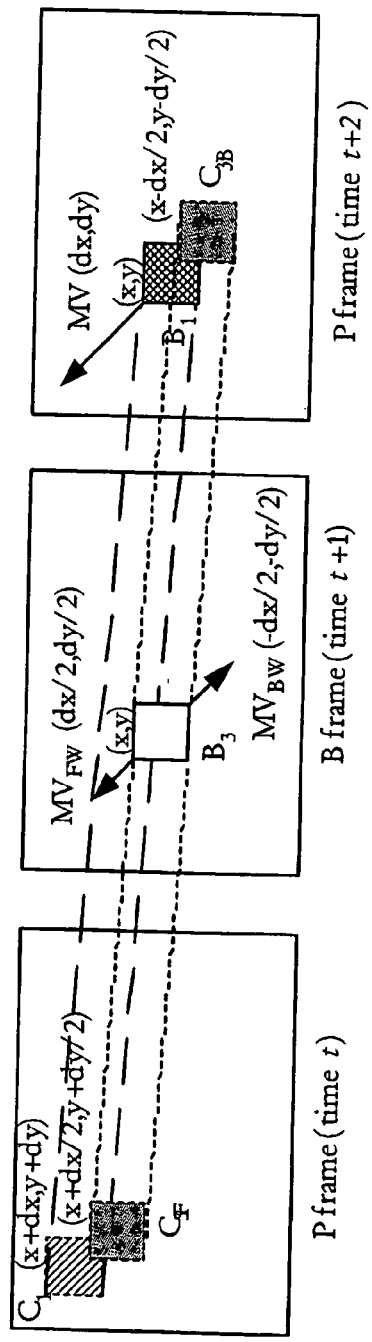
FIG. 4 is an illustrative diagram depicting Direct Prediction in B picture coding, in accordance with certain exemplary implementations of the present invention.

By way of example, FIG. 4 illustrates Direct Prediction in B picture at time t+1 coding based on P frames at times t and t+2, and the applicable motion vectors (MVs). Here, an assumption is made that an object in the picture is moving with constant speed. This makes it possible to predict a current position inside a B picture without having to transmit any motion vectors. The motion vectors ($\vec{MV}_{fw}, \vec{MV}_{bw}$) of the Direct Mode versus the motion vector $\vec{MV}$ of the collocated MB in the first subsequent P reference picture are basically calculated by:

$$\vec{MV}_{fw} = \frac{TR_B \cdot \vec{MV}}{TR_D}$$

and $$\vec{MV}_{bw} = \frac{(TR_B - TR_D) \cdot \vec{MV}}{TR_D},$$

where $TR_B$ is the temporal distance between the current B picture and the reference picture pointed by the forward MV of the collocated MB, and $TR_D$ is the temporal distance between the future reference picture and the reference picture pointed by the forward MV of the collocated MB.

Figure 5:
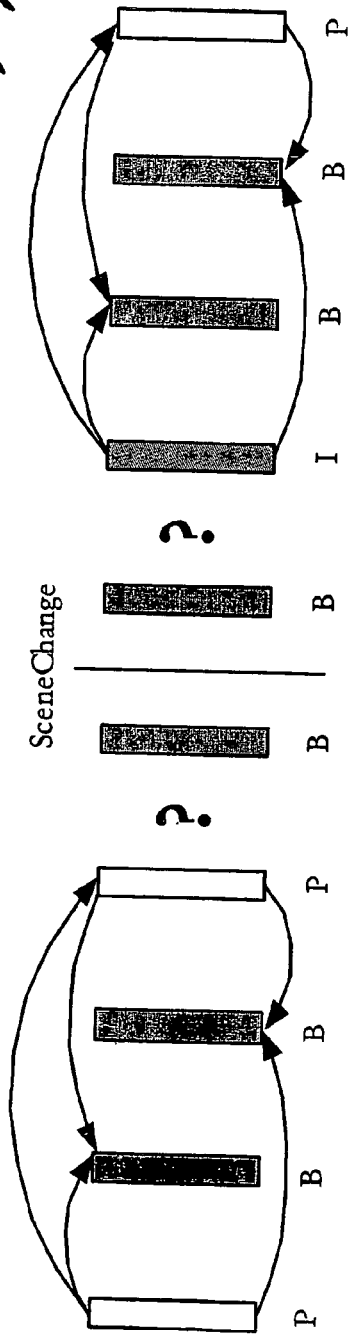
FIG. 5 is an illustrative diagram depicting what happens when a scene change happens or even when the collocated block is intra-coded, in accordance with certain exemplary implementations of the present invention.
Figure 6:
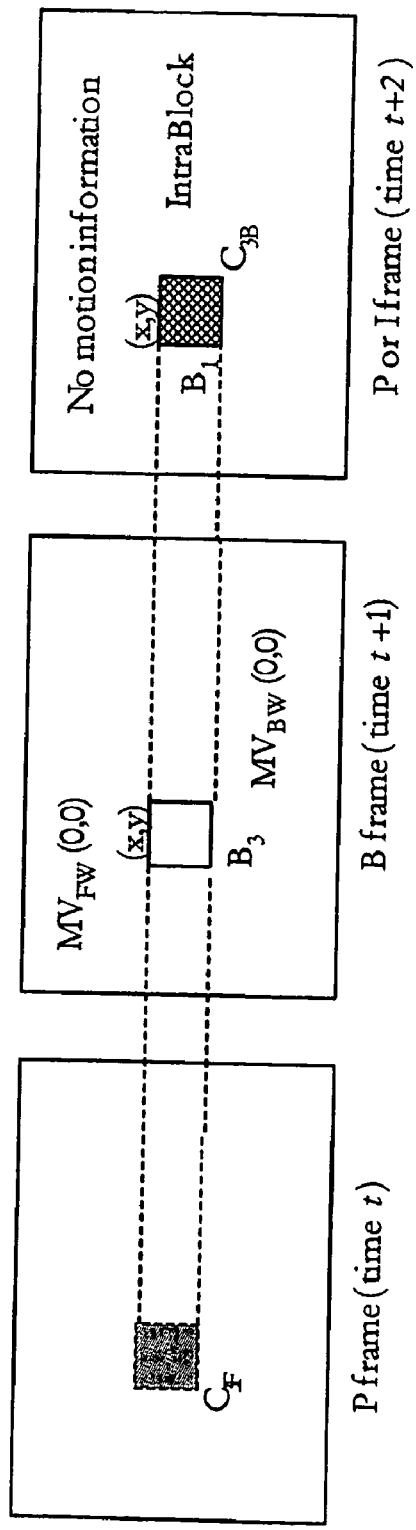
FIG. 6 is an illustrative diagram depicting handling of collocated intra within existing codecs wherein motion is assumed to be zero, in accordance with certain exemplary implementations of the present invention.

Unfortunately there are several cases where the existing Direct Mode does not provide an adequate solution, thus not efficiently exploiting the properties of this mode. In particular, existing designs of this mode usually force the motion parameters of the Direct Macroblock, in the case of the collocated Macroblock in the subsequent P picture being Intra coded, to be zero. For example, see FIG. 6, which illustrates handling of collocated intra within existing codecs wherein motion is assumed to be zero. This essentially means that, for this case, the B picture Macroblock will be coded as the average of the two collocated Macroblocks in the first subsequent and past P references. This immediately raises the following concern; if a Macroblock is Intra-coded, then how does one know how much relationship it has with the collocated Macroblock of its reference picture. In some situations, there may be little if any actual relationship. Hence, it is possible that the coding efficiency of the Direct Mode may be reduced. An extreme case can be seen in the case of a scene change as illustrated in FIG. 5. FIG. 5 illustrates what happens when a scene change occurs in the video sequence and/or what happens when the collocated block is intra. Here, in this example, obviously no relationship exists between the two reference pictures given the scene change. In such a case bidirectional prediction would provide little if any benefit. As such, the Direct Mode could be completely wasted. Unfortunately, conventional implementations of the Direct Mode restrict it to always perform a bidirectional prediction of a Macroblock.

Figure 7:
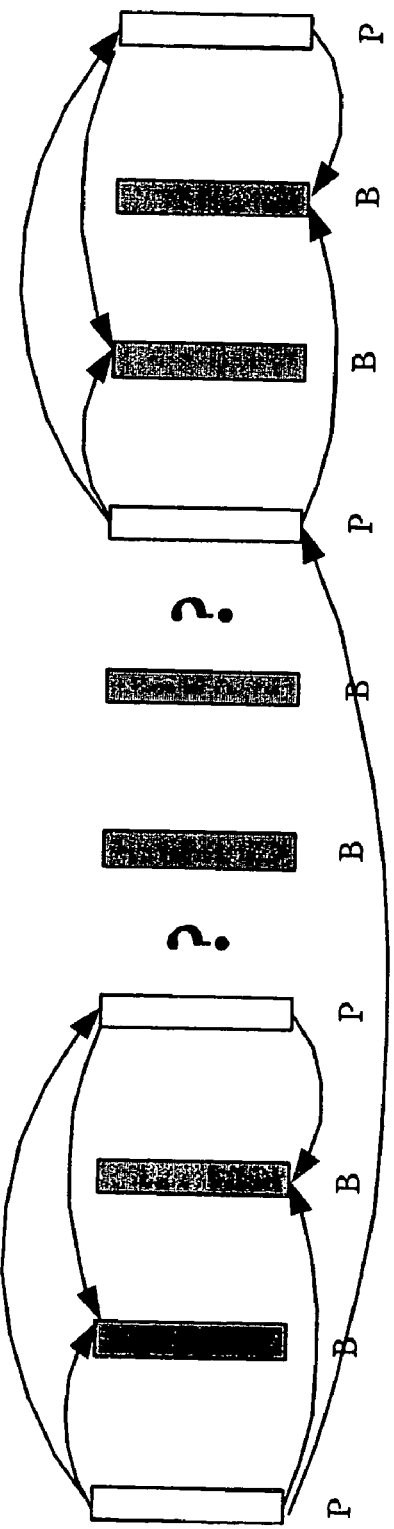
FIG. 7 is an illustrative diagram depicting how Direct Mode is handled when the reference picture of the collocated block in the subsequent P picture is other than zero, in accordance with certain exemplary implementations of the present invention.

FIG. 7 is an illustrative diagram depicting how Direct Mode is handled when the reference picture of the collocated block in the subsequent P picture is other than zero, in accordance with certain implementations of the present invention.

An additional issue with the Direct Mode Macroblocks exists when multi-picture reference motion compensation is used. Until recently, for example, the JVT standard provided the timing distance information ($TR_B$ and $TR_D$), thus allowing for the proper scaling of the parameters. Recently, this was changed in the new revision of the codec (see, e.g., Joint Video Team (JVT) of ISO/IEC MPEG and ITU-T VCEG, "Joint Committee Draft (CD) of Joint Video Specification (ITU-T Rec. H.264|ISO/IEC 14496-10 AVC)", ITU-T JVT-C167, May, 2002, which is incorporated herein by reference). In the new revision, the motion vector parameters of the subsequent P picture are to be scaled equally for the Direct Mode prediction, without taking in account the reference picture information. This could lead to significant performance degradation of the Direct Mode, since the constant motion assumption is no longer followed.

Nevertheless, even if the temporal distance parameters were available, it is not always certain that the usage of the Direct Mode as defined previously is the most appropriate solution. In particular for the B pictures which are closer to a first forward reference picture, the correlation might be much stronger with that picture, than the subsequent reference picture. An extreme example which could contain such cases could be a sequence where scene A changes to scene B, and then moves back to scene A (e.g., as may happen in a news bulletin, etc.). All the above could deter the performance of B picture encoding considerably since Direct Mode will not be effectively exploited within the encoding process.

With these and other concerns in mind, unlike the previous definitions of the Direct Mode where only temporal prediction was used, in accordance with certain aspects of the present invention, a new Direct Macroblock type is introduced wherein both temporal prediction and/or spatial prediction is considered. The type(s) of prediction used can depend on the type of reference picture information of the first subsequent P reference picture, for example.

In accordance with certain other aspects of the present invention, one may also further considerably improve motion vector prediction for both P and B pictures when multiple picture references are used, by taking in consideration temporal distances, if such are available.

These enhancements are implemented in certain exemplary methods and apparatuses as described below. The methods and apparatuses can achieve significant bitrate reductions while achieving similar or better quality.

Direct Mode Enhancements:

In most conventional video coding systems, Direct Mode is designed as a bidirectional prediction scheme where motion parameters are always predicted in a temporal way from the motion parameters in the subsequent P images. In this section, an enhanced Direct Mode technique is provided in which spatial information may also/alternatively be considered for such predictions.

One or more of the following exemplary techniques may be implemented as needed, for example, depending on the complexity and/or specifications of the system.

One technique is to implement spatial prediction of the motion vector parameters of the Direct Mode without considering temporal prediction. Spatial prediction can be accomplished, for example, using existing Motion Vector prediction techniques used for motion vector encoding (such as, e.g., median prediction). If multiple picture references are used, then the reference picture of the adjacent blocks may also be considered (even though there is no such restriction and the same reference, e.g. 0, could always be used).

Figure 3:
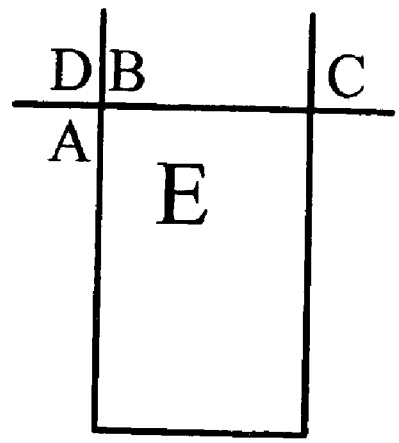
FIG. 3 is an illustrative diagram depicting spatial predication associated with portions of a picture, in accordance with certain exemplary implementations of the present invention.

Motion parameters and reference pictures could be predicted as follows and with reference to FIG. 3, which illustrates spatial predication associated with portions A-E (e.g., macroblocks, slices, etc.) assumed to be available and part of a picture. Here, E is predicted in general from A, B, C as Median (A,B,C). If C is actually outside of the picture then D is used instead. If B, C, and D are outside of picture, then only A is used, where as if A does not exist, such is replaced with (0,0). Those skilled in the art will recognize that spatial prediction may be done at a subblock level as well.

In general spatial prediction can be seen as a linear or nonlinear function of all available motion information calculated within a picture or a group of macroblocks/blocks within the same picture.

There are various methods available that may be arranged to predict the reference picture for Direct Mode. For example, one method may be to select a minimum reference picture among the predictions. In another method, a median reference picture may be selected. In certain methods, a selection may be made between a minimum reference picture and median reference picture, e.g., if the minimum is zero. In still other implementations, a higher priority could also be given to either vertical or horizontal predictors (A and B) due to their possibly stronger correlation with E.

If one of the predictions does not exist (e.g., all surrounding macroblocks are predicted with the same direction FW or BW only or are intra), then the existing one is only used (single direction prediction) or such could be predicted from the one available. For example if forward prediction is available then:

$$\overrightarrow{MV}_{bw} = \frac{(TR_B - TR_D) \cdot \overrightarrow{MV}_{fw}}{TR_B}$$

Figure 8:
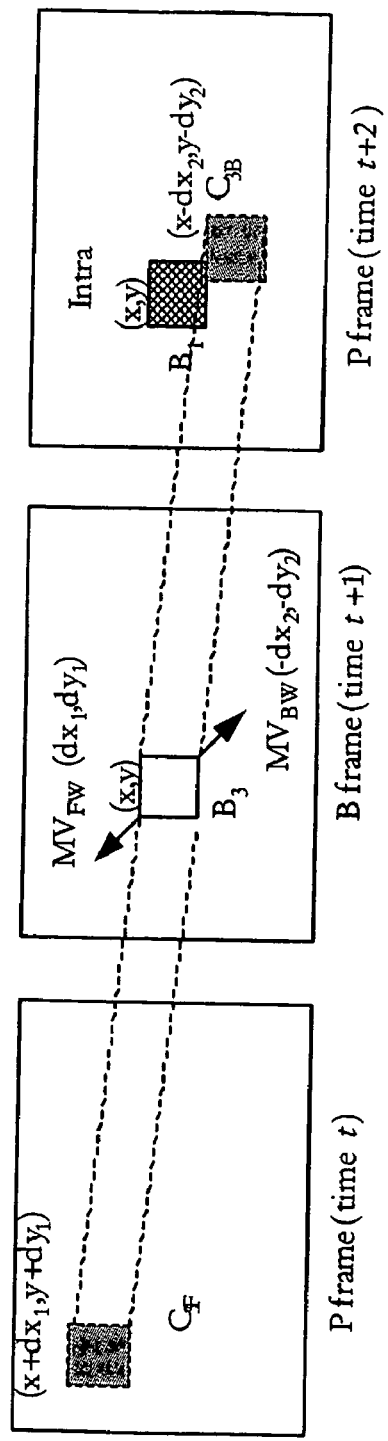
FIG. 8 is an illustrative diagram depicting an exemplary scheme wherein $MV_{FW}$ and $MV_{BW}$ are derived from spatial prediction, in accordance with certain exemplary implementations of the present invention.

Temporal prediction is used for Macroblocks if the subsequent P reference is non intra as in existing codecs. Attention is now drawn to FIG. 8, in which $MV_{FW}$ and $MV_{BW}$ are derived from spatial prediction (Median MV of surrounding Macroblocks). If either one is not available (i.e., no predictors) then one-direction is used. If a subsequent P reference is intra, then spatial prediction can be used instead as described above. Assuming that no restrictions exist, if one of the predictions is not available then Direct Mode becomes a single direction prediction mode.

Figure 9:
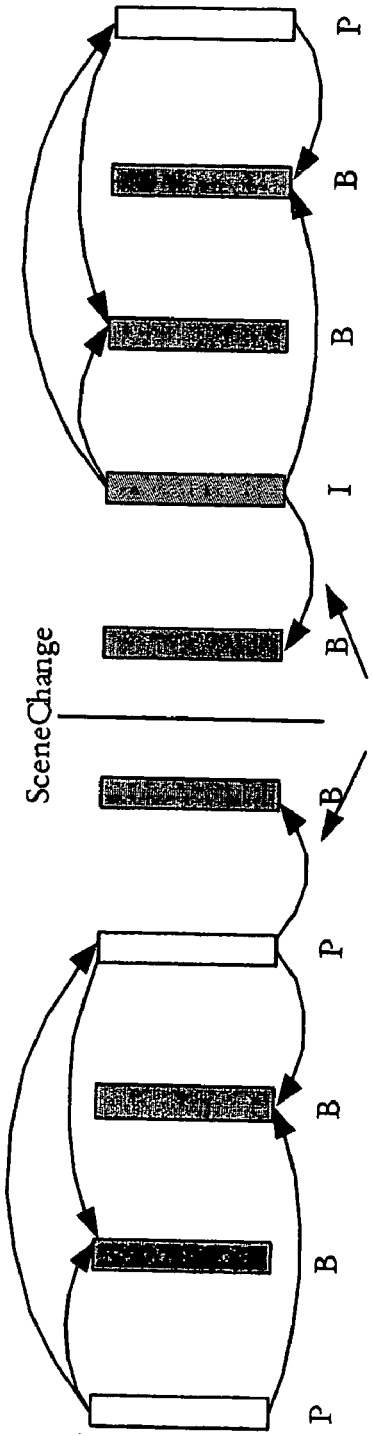
FIG. 9 is an illustrative diagram depicting how spatial prediction solves the problem of scene changes and the like, in accordance with certain exemplary implementations of the present invention.

This could considerably benefit video coding when the scene changes, for example, as illustrated in FIG. 9, and/or even when fading exists within a video sequence. As illustrated in FIG. 9, spatial prediction may be used to solve the problem of a scene change.

If temporal distance information is not available within a codec, temporal prediction will not be as efficient in the direct mode for blocks when the collocated P reference block has a non-zero reference picture. In such a case, spatial prediction may also be used as above. As an alternative, one may estimate scaling parameters if one of the surrounding macroblocks also uses the same reference picture as the collocated P reference block. Furthermore, special handling may be provided for the case of zero motion (or close to zero motion) with a non-zero reference. Here, regardless of temporal distance forward and backward motion vectors could always be taken as zero. The best solution, however, may be to always examine the reference picture information of surrounding macroblocks and based thereon decide on how the direct mode should be handled in such a case.

More particularly, for example, given a non-zero reference, the following sub cases may be considered:

Case A: Temporal prediction is used if the motion vectors of the collocated P block are zero.

Case B: If all surrounding macroblocks use different reference pictures than the collocated P reference, then spatial prediction appears to be a better choice and temporal prediction is not used.

Case C: If motion flow inside the B picture appears to be quite different than the one in the P reference picture, then spatial prediction is used instead.

Case D: Spatial or temporal prediction of Direct Mode macroblocks could be signaled inside the image header. A pre-analysis of the image could be performed to decide which should be used.

Case E: Correction of the temporally predicted parameters based on spatial information (or vice versa). Thus, for example, if both appear to have the same or approximately the same phase information then the spatial information could be a very good candidate for the direct mode prediction. A correction could also be done on the phase, thus correcting the sub pixel accuracy of the prediction.

Figure 10:
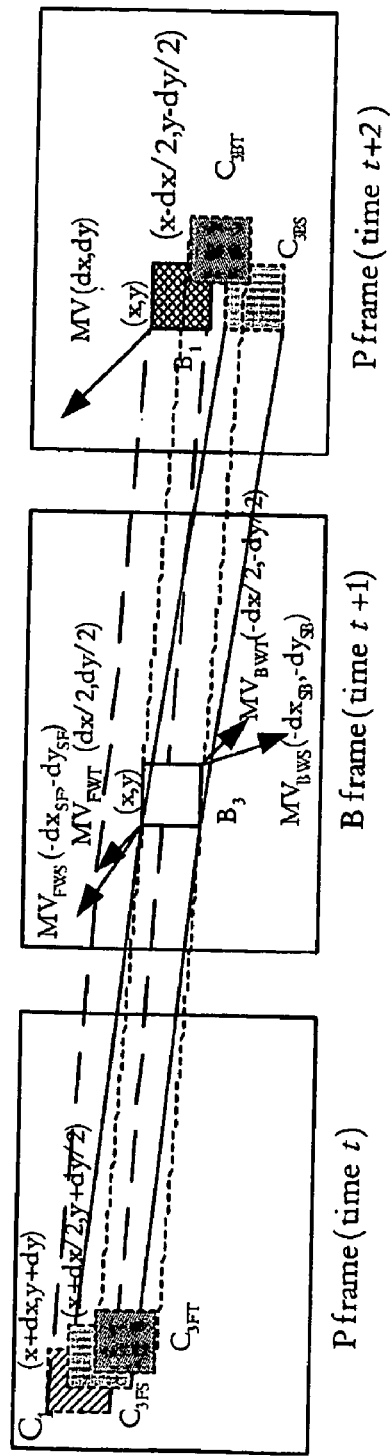
FIG. 10 is an illustrative diagram depicting joint spatio-temporal prediction for Direct Mode in B picture coding, in accordance with certain exemplary implementations of the present invention.

FIG. 10 illustrates a joint spatio-temporal prediction for Direct Mode in B picture coding. Here, in this example, Direct Mode can be a 1- to 4-direction mode depending on information available. Instead of using Bi-directional prediction for Direct Mode macroblocks, a multi-hypothesis extension of such mode can be done and multiple predictions used instead.

Combined with the discussion above, Direct Mode macroblocks can be predicted using from one up to four possible motion vectors depending on the information available. Such can be decided, for example, based on the mode of the collocated P reference image macroblock and on the surrounding macroblocks in the current B picture. In such a case, if the spatial prediction is too different than the temporal one, one of them could be selected as the only prediction in favor of the other. Since spatial prediction as described previously, might favor a different reference picture than the temporal one, the same macroblock might be predicted from more than 2 reference pictures.

Figure 12:
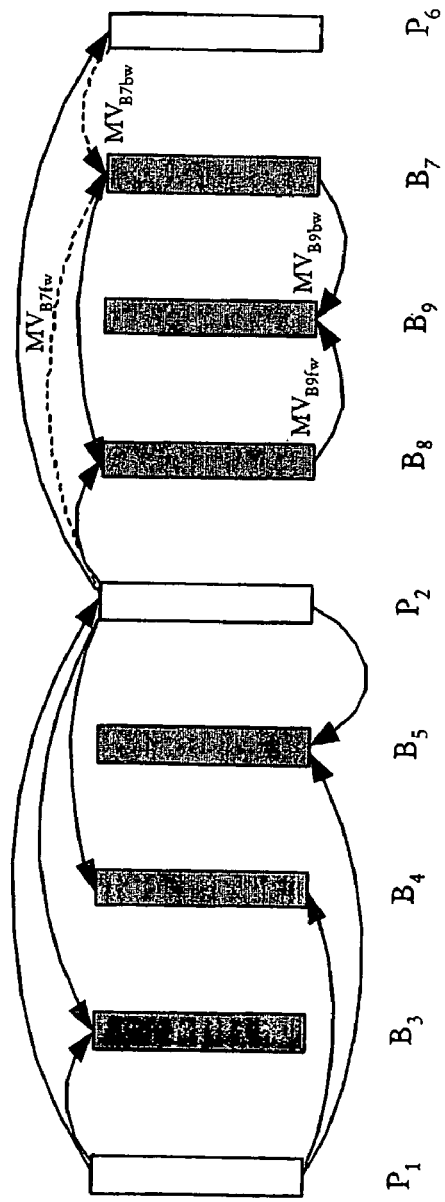
FIG. 12 is an illustrative diagram depicting how to use more candidates for Direct Mode prediction especially if bidirectional prediction is used within the B picture, in accordance with certain exemplary implementations of the present invention.

The JVT standard does not restrict the first future reference to be a P picture. Hence, in such a standard, a picture can be a B as illustrated in FIG. 12, or even a Multi-Hypothesis (MH) picture. This implies that more motion vectors are assigned per macroblock. This means that one may also use this property to increase the efficiency of the Direct Mode by more effectively exploiting the additional motion information.

In FIG. 12, the first subsequent reference picture is a B picture (pictures $B_8$ and $B_9$). This enables one to use more candidates for Direct Mode prediction especially if bidirectional prediction is used within the B picture.

In particular one may perform the following:

a.) If the collocated reference block in the first future reference is using bidirectional prediction, the corresponding motion vectors (forward or backward) are used for calculating the motion vectors of the current block. Since the backward motion vector of the reference corresponds to a future reference picture, special care should be taken in the estimate of the current motion parameters. Attention is drawn, for example to FIG. 12 in which the first subsequent reference picture is a B picture (pictures $B_8$ and $B_9$). This enables one to use more candidates for Direct Mode prediction especially if bidirectional prediction is used within the B picture. Thus, as illustrated, the backward motion vector of $B_8$ $\overrightarrow{MV}_{B8bw}$ can be calculated as $2 \times \overrightarrow{MV}_{B7bw}$ due to the temporal distance between $B_8$, $B_7$ and $P_6$. Similarly for $B_9$ the backward motion vector can be taken as $\overrightarrow{MV}_{B7bw}$, if though these refer to the $B_7$. One may also restrict these to refer to the first subsequent P picture, in which case these motion vectors can be scaled accordingly. A similar conclusion can be deduced about the forward motion vectors. Multiple picture reference or intra macroblocks can be handled similar to the previous discussion.

b.) If bidirectional prediction for the collocated block is used, then, in this example, one may estimate four possible predictions for one macroblock for the direct mode case by projecting and inverting the backward and forward motion vectors of the reference.

c.) Selective projection and inversion may be used depending on temporal distance. According to this solution, one selects the motion vectors from the reference picture which are more reliable for the prediction. For example, considering the illustration in FIG. 12, one will note that $B_8$ is much closer to $P_2$ than $P_6$. This implies that the backward motion vector of $B_7$ may not be a very reliable prediction. In this case, direct mode motion vectors can therefore be calculated only from the forward prediction of $B_7$. For $B_9$, however, both motion vectors seem to be adequate enough for the prediction and therefore may be used. Such decisions/information may also be decided/supported within the header of the image. Other conditions and rules may also be implemented. For example, additional spatial confidence of a prediction and/or a motion vector phase may be considered. Note, in particular, that if the forward and backward motion vectors have no relationship, then the backward motion vector might be too unreliable to use.

Single Picture Reference for B Pictures:

A special case exists with the usage of only one picture reference for B pictures (although, typically a forward and a backward reference are necessary) regardless of how many reference pictures are used in P pictures. From observations of encoding sequences in the current JVT codec, for example, it was noted that, if one compares the single-picture reference versus the multi-picture reference case using B pictures, even though encoding performance of P pictures for the multi-picture case is almost always superior to that of the single-picture, the some is not always true for B pictures.

One reason for this observation is the overhead of the reference picture used for each macroblock. Considering that B pictures rely more on motion information than P pictures, the reference picture information overhead reduces the number of bits that are transmitted for the residue information at a given bitrate, which thereby reduces efficiency. A rather easy and efficient solution could be the selection of only one picture reference for either backward or forward motion compensation, thus not needing to transmit any reference picture information.

Figure 13:
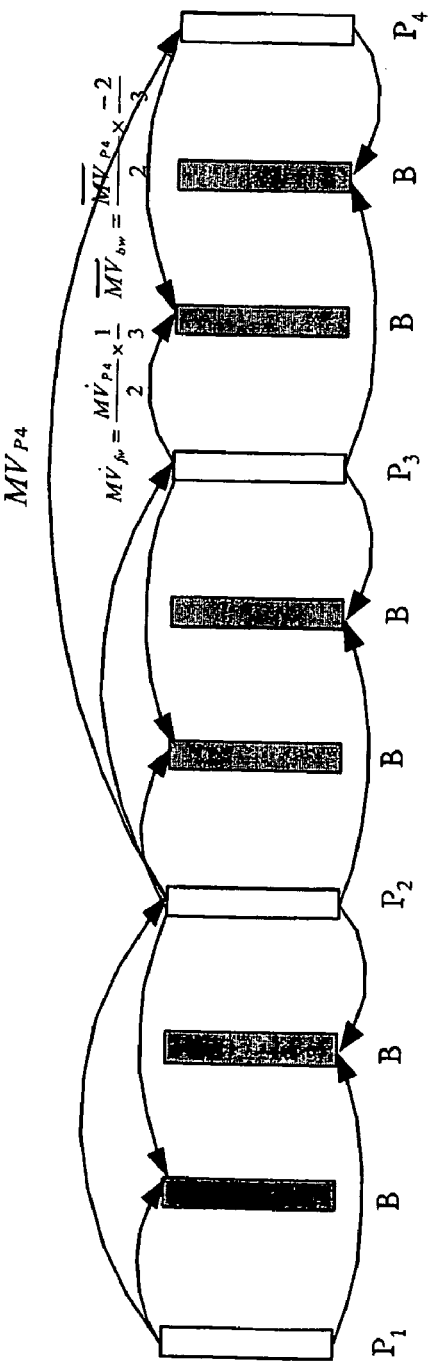
FIG. 13 is an illustrative diagram depicting how B pictures may be restricted in using future and past reference pictures, in accordance with certain exemplary implementations of the present invention.
Figure 14:
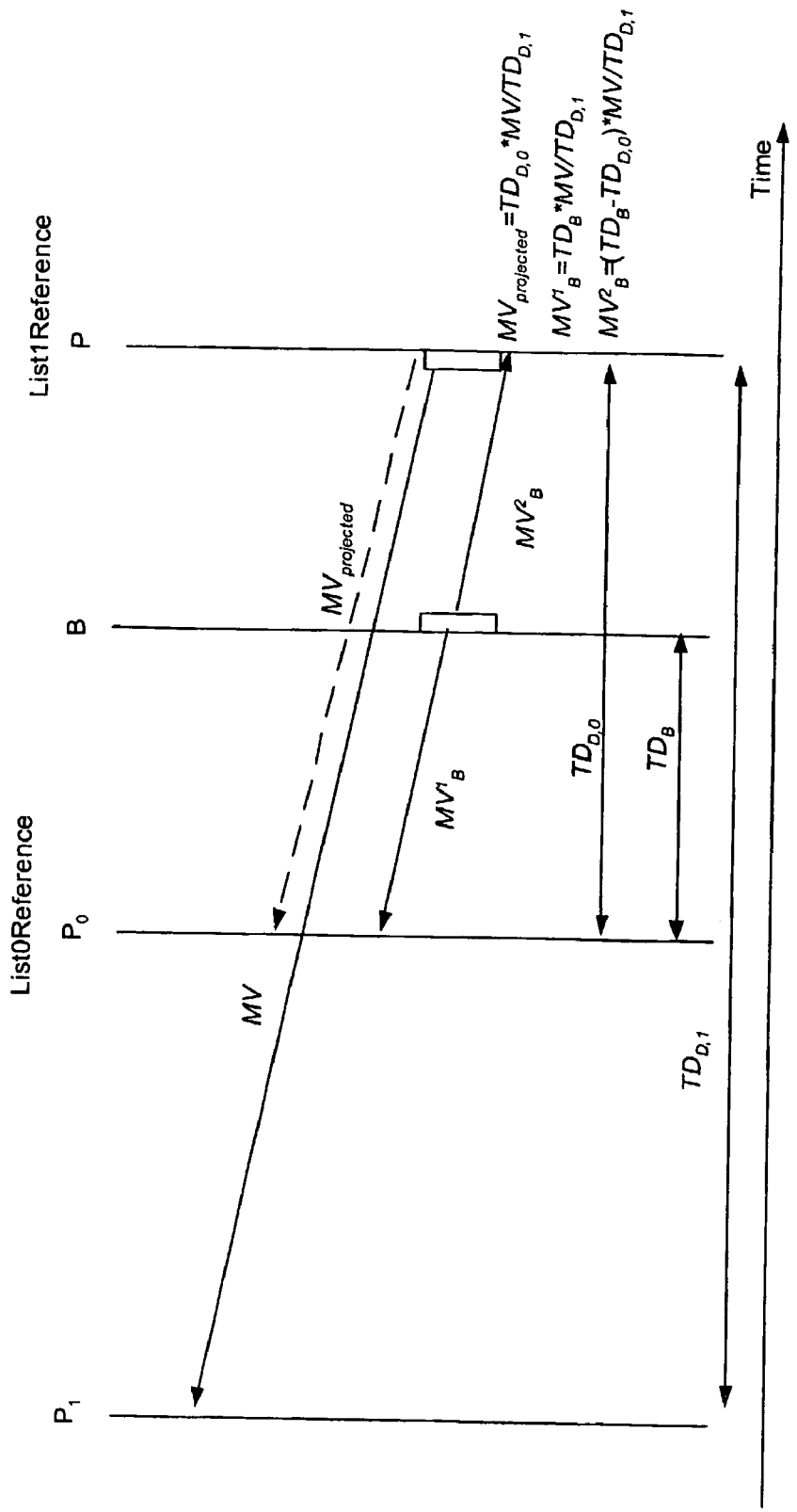
FIG. 14 is an illustrative diagram depicting projection of collocated Motion Vectors to a current reference for temporal direct prediction, in accordance with certain exemplary implementations of the present invention.

This is considered with reference to FIGS. 13 and 14. As illustrated in FIG. 13, B pictures can be restricted in using only one future and past reference pictures. Thus, for direct mode motion vector calculation, projection of the motion vectors is necessary. A projection of the collocated MVs to the current reference for temporal direct prediction is illustrated in FIG. 14 (note that it is possible that $TD_{D,0} > TD_{D,1}$). Thus, in this example, Direct Mode motion parameters are calculated by projecting motion vectors that refer to other reference pictures to the two reference pictures, or by using spatial prediction as in FIG. 13. Note that such options not only allow for possible reduced encoding complexity of B pictures, but also tend to reduce memory requirements since fewer B pictures (e.g., maximum two) are needed to be stored if B pictures are allowed to reference B pictures.

In certain cases a reference picture of the first future reference picture may no longer be available in the reference buffer. This could immediately generate a problem for the estimate of Direct Mode macroblocks and special handling of such cases is required. Obviously there is no such problem if a single picture reference is used. However, if multiple picture references are desired, then possible solutions include projecting the motion vector(s) to either the first forward reference picture, and/or to the reference picture that was closest to the non available picture. Either solution could be viable, whereas again spatial prediction could be an alternative solution.

Refinements of the Motion Vector Prediction for Single- and Multi-Picture Reference Motion Compensation Motion vector prediction for multi-picture reference motion compensation can significantly affect the performance of both B and P picture coding. Existing standards, such as, for example, JVT, do not always consider the reference pictures of the macroblocks used in the prediction. The only consideration such standards do make is when only one of the prediction macroblocks uses the same reference. In such a case, only that predictor is used for the motion prediction. There is no consideration of the reference picture if only one or all predictors are using a different reference.

Figure 11:
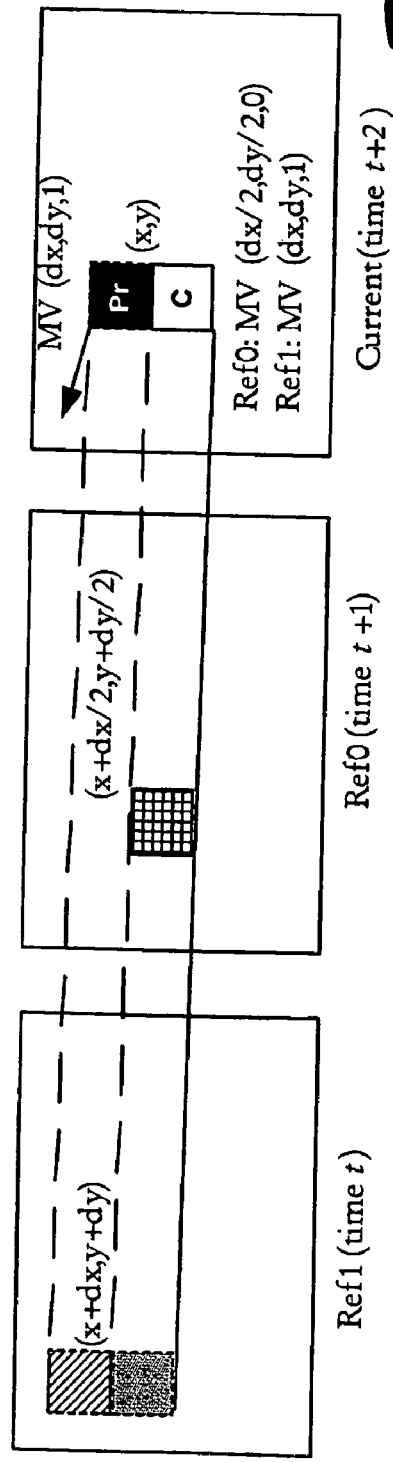
FIG. 11 is an illustrative diagram depicting Motion Vector Prediction of a current block considering reference picture information of predictor macroblocks, in accordance with certain exemplary implementations of the present invention.

In such a case, for example, and in accordance with certain further aspects of the present invention, one can scale the predictors according to their temporal distance versus the current reference. Attention is drawn to FIG. 11, which illustrates Motion Vector prediction of a current block (C) considering the reference picture information of predictor macroblocks (Pr) and performance of proper adjustments (e.g., scaling of the predictors)

If predictors A, B, and C use reference pictures with temporal distance $TR_A$, $TR_B$, and $TR_C$ respectively, and the current reference picture has a temporal distance equal to TR, then the median predictor is calculated as follows:

$$\vec{MV}_{pred} = TR \times \text{Median}\left(\frac{\vec{MV}_A}{TR_A}, \frac{\vec{MV}_B}{TR_B}, \frac{\vec{MV}_C}{TR_C}\right)$$

If integer computation is to be used, it may be easier to place the multiplication inside the median, thus increasing accuracy. The division could also be replaced with shifting, but that reduces the performance, whereas it might be necessary to handle signed shifting as well ($-1 >> N = -1$). It is thus very important in such cases to have the temporal distance information available for performing the appropriate scaling. Such could also be available within the header, if not predictable otherwise.

Figure 15:
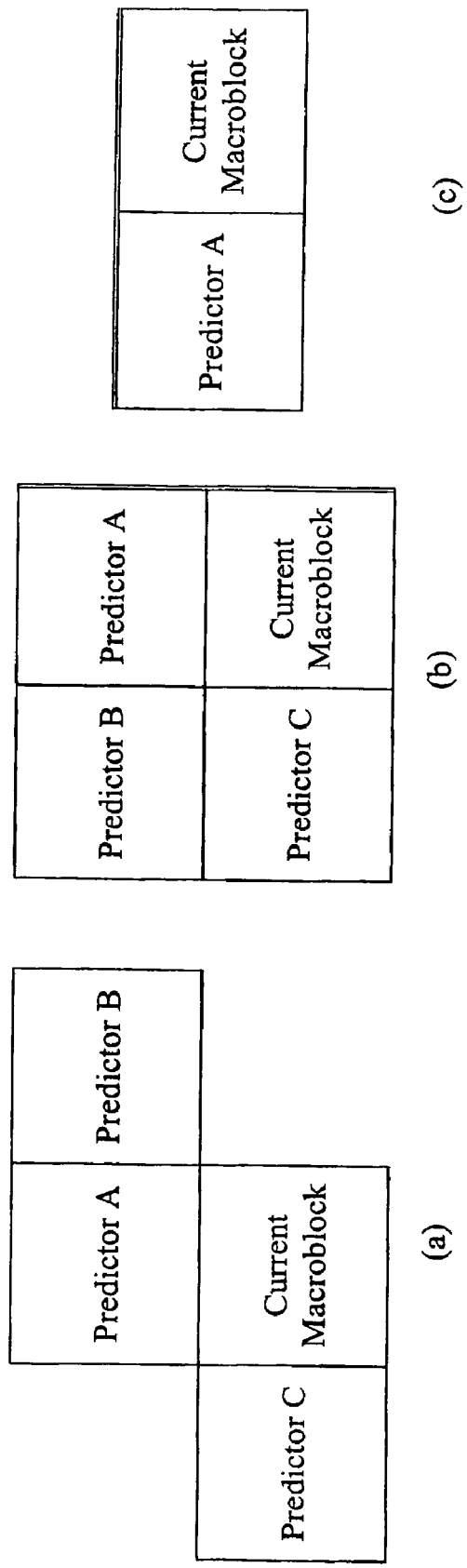
FIGS. 15a-c are illustrative diagrams depicting Motion Vector Predictors for one MV in different configurations, in accordance with certain exemplary implementations of the present invention.

Motion Vector prediction as discussed previously is basically median biased, meaning that the median value among a set of predictors is selected for the prediction. If one only uses one type of macroblock (e.g., 16×16) with one Motion Vector (MV), then these predictors can be defined, for example, as illustrated in FIG. 15. Here, MV predictors are shown for one MV. In FIG. 15a, the MB is not in the first row or the last column. In FIG. 15b, the MB is in the last column. In FIG. 15c, the MB is in the first row.

The JVT standard improves on this further by also considering the case that only one of the three predictors exists (i.e. Macroblocks are intra or are using a different reference picture in the case of multi-picture prediction). In such a case, only the existing or same reference predictor is used for the prediction and all others are not examined.

Intra coding does not always imply that a new object has appeared or that scene changes. It might instead, for example, be the case that motion estimation and compensation is inadequate to represent the current object (e.g., search range, motion estimation algorithm used, quantization of residue, etc) and that better results could be achieved through Intra Coding instead. The available motion predictors could still be adequate enough to provide a good motion vector predictor solution.

What is intriguing is the consideration of subblocks within a Macroblock, with each one being assigned different motion information. MPEG4 and H.263 standards, for example, can have up to four such subblocks (e.g., with size 8×8), where as the JVT standard allows up to sixteen subblocks while also being able to handle variable block sizes (e.g., 4×4, 4×8, 8×4, 8×8, 8×16, 16×8, and 16×16). In addition JVT also allows for 8×8 Intra subblocks, thus complicating things even 23 further.

Figure 16:
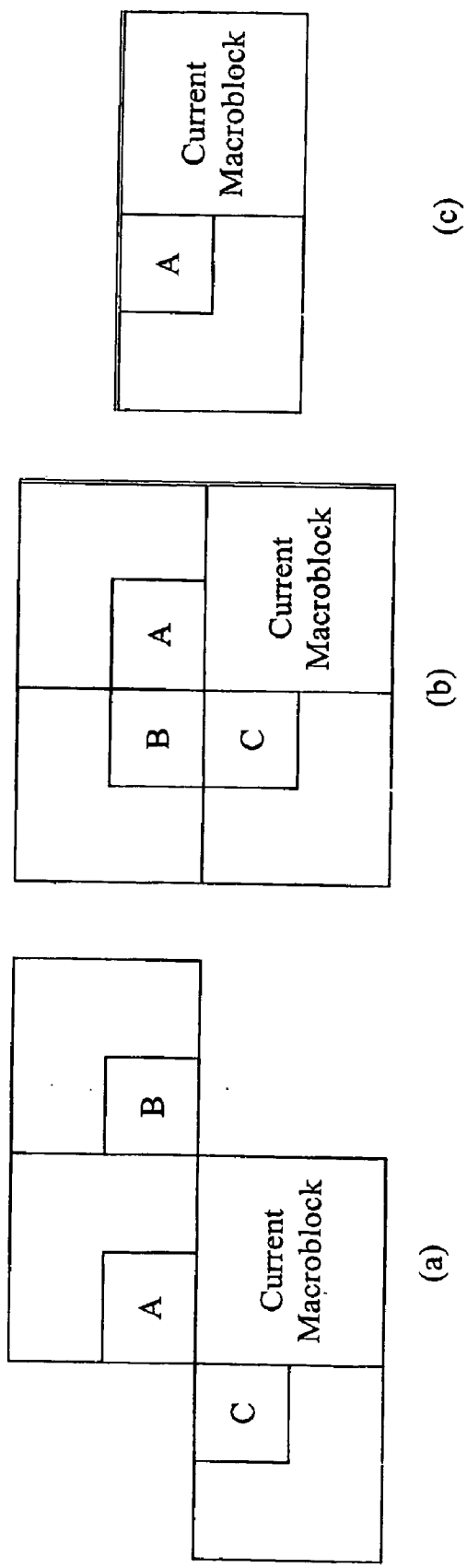
FIGS. 16a-c are illustrative diagrams depicting Motion Vector Predictors for one MV with 8×8 partitions in different configurations, in accordance with certain exemplary implementations of the present invention.

Considering the common cases of JVT and MPEG-4/H.263 (8×8 and 16×16), the predictor set for a 16×16 macroblock is illustrated in FIGS. 16*a-c* having a similar arrangement to FIGS. 15*a-c*, respectively. Here, Motion Vector predictors are shown for one MV with 8×8 partitions. Even though the described predictors could give reasonable results in some cases, it appears that they may not adequately cover all possible predictions.

Attention is drawn next to FIGS. 17*a-c*, which are also in a similar arrangement to FIGS. 15*a-c*, respectively. Here, in FIGS. 17*a-c* there are two additional predictors that could also be considered in the prediction phase ($C_1$ and $A_2$). If 4×4 blocks are also considered, this increases the possible predictors by four.

Instead of employing a median of the three predictors A, B, and C (or $A_1$, B, and $C_2$) one may now have some additional, and apparently more reliable, options. Thus, for example, one can observe that predictors $A_1$ and $C_2$ are essentially too close with one another and it may be the case that they may not be too representative in the prediction phase. Instead, selecting predictors $A_1$, $C_1$, and B seems to be a more reliable solution due to their separation. An alternative could also be the selection of $A_2$ instead of $A_1$ but that may again be too close to predictor B. Simulations suggest that the first case is usually a better choice. For the last column $A_2$ could be used instead of $A_1$. For the first row either one of $A_1$ and $A_2$ or even their average value could be used. Gain up to 1% was noted within JVT with this implementation.

The previous case adds some tests for the last column. By examining FIG. 7*b*, for example, it is obvious that such tends to provide the best partitioning available. Thus, an optional solution could be the selection of $A_2$, $C_1$, and B (from the upper-left position). This may not always be recommended however, since such an implementation may adversely affect the performance of right predictors.

An alternative solution would be the usage of averages of predictors within a Macroblock. The median may then be performed as follows:

$$\vec{MV}_{pred} = \text{Median}(\text{Ave}(\vec{MV}_{C_1}, \vec{MV}_{C_2}), \text{Ave}(\vec{MV}_{A_1}, \vec{MV}_{A_2}), \vec{MV}_B)$$

For median row/column calculation, the median can be calculated as:

$$\vec{MV}_{pred} = \text{Median}(\text{Median}(\vec{MV}_{C_1}, \vec{MV}_{C_2}, \vec{MV}_D), \ldots \text{Median}(\vec{MV}_D, \vec{MV}_{A_1}, \vec{MV}_{C_1}), \text{Median}(\vec{MV}_B, \vec{MV}_{A_1}, \vec{MV}_{A_2}))$$

Another possible solution is a Median5 solution. This is probably the most complicated solution due to computation (quick-sort or bubble-sort could for example be used), but could potentially yield the best results. If 4×4 blocks are considered, for example, then Median9 could also be used:

$$\vec{MV}_{pred} = \text{Median}(\vec{MV}_{C_1}, \vec{MV}_{C_2}, \vec{MV}_D, \vec{MV}_B, \vec{MV}_{A_1}, \vec{MV}_{A_2})$$

Considering that JVT allows the existence of Intra subblocks within an Inter Macroblock (e.g., tree macroblock structure), such could also be taken in consideration within the Motion Prediction. If a subblock (e.g., from Macroblocks above or left only) to be used for the MV prediction is Intra, then the adjacent subblock may be used instead. Thus, if $A_1$ is intra but $A_2$ is not, then $A_1$ can be replaced by $A_2$ in the prediction. A further possibility is to replace one missing Intra Macroblock with the MV predictor from the upper-left position. In FIG. 17*a*, for example, if $C_1$ is missing then D may be used instead.

In the above sections, several improvements on B picture Direct Mode and on Motion Vector Prediction were presented. It was illustrated that spatial prediction can also be used for Direct Mode macroblocks; where as Motion Vector prediction should consider temporal distance and subblock information for more accurate prediction. Such considerations should significantly improve the performance of any applicable video coding system.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method for use in encoding video data in a video encoder, the method comprising:
    making a spatial/temporal motion vector prediction decision for at least one direct mode macroblock in a B-picture, wherein the spatial/temporal motion vector prediction decision indicates use of spatial motion vector prediction for the at least one direct mode macroblock;
    selectively encoding the at least one direct mode macroblock, wherein the encoding includes for a given direct mode macroblock of the at least one direct mode macroblock:
    selecting a reference picture for the given direct mode macroblock from among reference pictures used for surrounding portions of the B-picture, wherein the selecting the reference picture for the given direct mode macroblock comprises selecting a minimum reference picture index for the given direct mode macroblock from among the reference picture indices used for the surrounding portions of the B-picture;
    performing spatial motion vector prediction for the given direct mode macroblock; and
    performing motion compensation for the given direct mode macroblock; and
    signaling spatial/temporal motion vector prediction decision information for the at least one direct mode macroblock in a header that includes header information for plural macroblocks in the B-picture, wherein the signaling of the spatial/temporal motion vector prediction decision information in the header communicates to a video decoder the spatial/temporal motion vector prediction decision for the at least one direct mode macroblock.

2. The method of claim 1 wherein the plural macroblocks in the B-picture are in a slice of the B-picture.

3. The method of claim 1 wherein the at least one direct mode macroblock comprises plural direct mode macroblocks.

4. The method of claim 3 wherein the plural direct mode macroblocks are 16×16 macroblocks.

5. The method of claim 4 wherein each of the 16×16 macroblocks includes four 8×8 sub-blocks.

6. The method of claim 1 wherein the surrounding portions are surrounding macroblocks.

7. The method of claim 1 wherein the spatial motion vector prediction comprises median motion vector prediction.

8. The method of claim 1 further comprising:
analyzing the B-picture, wherein the spatial/temporal motion vector prediction decision is based at least in part on the analysis.

9. The method of claim 1 further comprising:
analyzing motion flow within the B-picture, wherein the spatial/temporal motion vector prediction decision is based at least in part on the analysis.

10. The method of claim 1 further comprising:
analyzing whether collocated blocks of a subsequent picture have zero motion, the subsequent picture following the B-picture, wherein the spatial/temporal motion vector prediction decision is based at least in part on the analysis.

11. The method of claim 1 further comprising:
analyzing temporal distance between the B-picture and pictures around the B-picture, wherein the spatial/temporal motion vector prediction decision is based at least in part on the analysis.

12. The method of claim 1 further comprising:
identifying a scene change around the B-picture, wherein the spatial/temporal motion vector prediction decision is based at least in part on the identification of the scene change.

13. A method for use in decoding video data in a video decoder, the method comprising:
receiving signaled spatial/temporal motion vector prediction decision information for at least one direct mode macroblock in a header that includes header information for plural macroblocks in a B-picture;
from the signaled spatial/temporal motion vector prediction decision information in the header, determining a spatial/temporal motion vector prediction decision for the at least one direct mode macroblock, wherein the spatial or temporal motion vector prediction decision indicates use of spatial motion vector prediction for the at least one direct mode macroblock; and
decoding the at least one direct mode macroblock, wherein the decoding includes for a given direct mode macroblock of the at least one direct mode macroblock:
selecting a reference picture for the given direct mode macroblock from among reference pictures used for surrounding portions of the B-picture, wherein the selecting the reference picture for the given direct mode macroblock comprises selecting a minimum reference picture index for the given direct mode macroblock from among the reference picture indices used for the surrounding portions of the B-picture;
performing spatial motion vector prediction for the given direct mode macroblock; and
performing motion compensation for the given direct mode macroblock.

14. The method of claim 13 wherein the plural macroblocks in the B-picture are in a slice of the B-picture.

15. The method of claim 13 wherein the at least one direct mode macroblock comprises plural direct mode macroblocks.

16. The method of claim 15 wherein the plural direct mode macroblocks are 16×16 macroblocks.

17. The method of claim 16 wherein each of the 16×16 macroblocks includes four 8×8 sub-blocks.

18. The method of claim 13 wherein the surrounding portions are surrounding macroblocks.

19. The method of claim 13 further comprising:
displaying visual results of the decoding of the video data; and
reproducing audio data associated with the video data.

20. A video decoder implemented with a computing device, wherein the video decoder is adapted to perform a method comprising:
receiving signaled spatial/temporal motion vector prediction decision information for at least one direct mode macroblock in a header that includes header information for plural macroblocks in a B-picture;
from the signaled spatial/temporal motion vector prediction decision information in the header, determining a spatial/temporal motion vector prediction decision for the at least one direct mode macroblock, wherein the spatial or temporal motion vector prediction decision indicates use of spatial motion vector prediction for the at least one direct mode macroblock; and
decoding the at least one direct mode macroblock, wherein the decoding includes for a given direct mode macroblock of the at least one direct mode macroblock:
selecting a reference picture for the given direct mode macroblock from among reference pictures used for surrounding portions of the B-picture, wherein the selecting the reference picture for the given direct mode macroblock comprises selecting a minimum reference picture index for the given direct mode macroblock from among the reference picture indices used for the surrounding portions of the B-picture;
performing spatial motion vector prediction for the given direct mode macroblock; and
performing motion compensation for the given direct mode macroblock.

21. The video decoder of claim 20 wherein the plural macroblocks in the B-picture are in a slice of the B-picture.

22. The video decoder of claim 20 wherein the at least one direct mode macroblock comprises plural direct mode macroblocks.

23. The video decoder of claim 20 wherein the surrounding portions are surrounding macroblocks.

24. The video decoder of claim 20 wherein the computing device further includes an audio reproduction module for reproducing audio data.

25. The video decoder of claim 20 wherein the computing device is a hand-held device that includes a display, a network interface, one or more processors and memory.

26. The video decoder of claim 20 wherein the computing device is a portable communication device that includes a display, a network interface, one or more processors and memory.

27. The video decoder of claim 20 wherein the computing device is a set-top box that includes a network interface, one or more processors and memory.

28. One or more memory devices having stored thereon computer-executable instructions for causing a computing device programmed thereby to perform a method of decoding video data, the method comprising:
receiving signaled spatial/temporal motion vector prediction decision information for at least one direct mode macroblock in a header that includes header information for plural macroblocks in a B-picture;
from the signaled spatial/temporal motion vector prediction decision information in the header, determining a spatial/temporal motion vector prediction decision for the at least one direct mode macroblock, wherein the spatial or temporal motion vector prediction decision indicates use of spatial motion vector prediction for the at least one direct mode macroblock; and decoding the at least one direct mode macroblock, wherein the decoding includes for a given direct mode macroblock of the at least one direct mode macroblock:

selecting a reference picture for the given direct mode macroblock from among reference pictures used for surrounding portions of the B-picture, wherein the selecting the reference picture for the given direct mode macroblock comprises selecting a minimum reference picture index for the given direct mode macroblock from among the reference picture indices used for the surrounding portions of the B-picture;

performing spatial motion vector prediction for the given direct mode macroblock; and performing motion compensation for the given direct mode macroblock.

29. The one or more memory devices of claim 28 wherein the surrounding portions are surrounding macroblocks.

30. The one or more memory devices of claim 28 wherein the surrounding portions are surrounding macroblocks.

31. A portable communication device that includes a display, a network interface, one or more processors, memory, an audio reproduction module for reproducing audio, and a video decoder, wherein the video decoder is adapted to perform a method comprising:

receiving signaled spatial/temporal motion vector prediction decision information for at least one direct mode macroblock in a header that includes header information for plural macroblocks in a slice of a B-picture;

from the signaled spatial/temporal motion vector prediction decision information in the header, determining a spatial/temporal motion vector prediction decision for the at least one direct mode macroblock, wherein the spatial or temporal motion vector prediction decision indicates use of spatial motion vector prediction for the at least one direct mode macroblock; and decoding the at least one direct mode macroblock, wherein the decoding includes for a given direct mode macroblock of the at least one direct mode macroblock:

selecting a reference picture for the given direct mode macroblock from among reference pictures used for surrounding portions of the B-picture, wherein the selecting the reference picture for the given direct mode macroblock comprises selecting a minimum reference picture index for the given direct mode macroblock from among the reference picture indices used for the surrounding portions of the B-picture;

performing spatial motion vector prediction for the given direct mode macroblock; and performing motion compensation for the given direct mode macroblock.

32. A video encoder implemented with a computing device, wherein the video encoder is adapted to perform a method comprising:

analyzing one or more pictures of a video sequence;

based at least in part on results of the analyzing, making a spatial/temporal motion vector prediction decision for at least one direct mode macroblock in a B-picture among the one or more pictures of the video sequence, wherein the spatial/temporal motion vector prediction decision indicates use of spatial motion vector prediction for the at least one direct mode macroblock;

selectively encoding the at least one direct mode macroblock, wherein the encoding includes for a given direct mode macroblock of the at least one direct mode macroblock:

selecting a reference picture for the given direct mode macroblock from among reference pictures used for surrounding portions of the B-picture, wherein the selecting the reference picture for the given direct mode macroblock comprises selecting a minimum reference picture index for the given direct mode macroblock from among the reference picture indices used for the surrounding portions of the B-picture;

performing spatial motion vector prediction for the given direct mode macroblock; and performing motion compensation for the given direct mode macroblock; and signaling spatial/temporal motion vector prediction decision information for the at least one direct mode macroblock in a header that includes header information for plural macroblocks in the B-picture, wherein the signaling of the spatial/temporal motion vector prediction decision information in the header communicates to a video decoder the spatial/temporal motion vector prediction decision for the at least one direct mode macroblock.

33. The video encoder of claim 32 wherein the plural macroblocks in the B-picture are in a slice of the B-picture.

34. The video encoder of claim 32 wherein the surrounding portions are surrounding macroblocks.

35. The video encoder of claim 32 wherein the analyzing comprises analyzing the B-picture.

36. The video encoder of claim 32 wherein the analyzing comprises analyzing motion flow within the B-picture.

37. The video encoder of claim 32 wherein the analyzing comprises analyzing whether collocated blocks of a subsequent picture have zero motion, the subsequent picture following the B-picture.

38. The video encoder of claim 32 wherein the analyzing comprises analyzing temporal distance between the B-picture and pictures around the B-picture.

39. The video encoder of claim 32 wherein the analyzing comprises identifying a scene change around the B-picture.

* * * * *